US008559576B2

(12) United States Patent
Ono et al.

(10) Patent No.: US 8,559,576 B2
(45) Date of Patent: Oct. 15, 2013

(54) ADAPTIVE SYNCHRONIZATION CIRCUIT

(75) Inventors: Tarik Ono, Brookline, MA (US); Mark R. Greenstreet, Vancouver (CA)

(73) Assignee: Oracle America, Inc., Redwood Shores, CA (US)

( * ) Notice: Subject to any disclaimer, the term of this patent is extended or adjusted under 35 U.S.C. 154(b) by 1428 days.

(21) Appl. No.: 12/193,609

(22) Filed: Aug. 18, 2008

(65) Prior Publication Data

US 2009/0323876 A1    Dec. 31, 2009

Related U.S. Application Data

(60) Provisional application No. 61/076,994, filed on Jun. 30, 2008.

(51) Int. Cl.
*H04L 7/00* (2006.01)

(52) U.S. Cl.
USPC ........... 375/354; 375/356; 375/370; 370/350; 370/509; 370/513; 370/514; 327/144; 327/213; 713/400; 326/93; 326/94

(58) Field of Classification Search
USPC .......... 375/354, 370, 356; 370/350, 509, 513, 370/514; 713/400; 327/144, 213; 326/93, 326/94
See application file for complete search history.

(56) References Cited

U.S. PATENT DOCUMENTS

| | | | | |
|---|---|---|---|---|
| 5,132,990 | A * | 7/1992 | Dukes ........................... | 375/362 |
| 5,548,786 | A * | 8/1996 | Amini et al. .................... | 710/22 |
| 6,850,092 | B2 * | 2/2005 | Chelcea et al. ................. | 326/93 |
| 7,129,859 | B2 * | 10/2006 | Dreps et al. ..................... | 341/50 |
| 7,665,059 | B2 * | 2/2010 | Czeck et al. ................... | 716/104 |
| 8,001,409 | B2 * | 8/2011 | Osborn et al. ................. | 713/400 |
| 2008/0198956 | A1 * | 8/2008 | Nagarajan ..................... | 375/354 |
| 2009/0244993 | A1 * | 10/2009 | Udell et al. .................... | 365/193 |

OTHER PUBLICATIONS

Chapiro, D. M., "Globally-Asynchronous, Locally-Synchronous Systems", PhD thesis, Dept. of Computer Science, Stanford University, Oct. 1984.
Chelcea Tiberiu and Nowick, Steven M., "Robust interfaces for Mixed-Timing Systems", IEEE Transactions on VLSI, vol. 12, No. 8, Aug. 2004, pp. 857-873.

(Continued)

*Primary Examiner* — Daniel Washburn
*Assistant Examiner* — Rahel Guarino
(74) *Attorney, Agent, or Firm* — Park, Vaughan, Fleming & Dowler, LLP; Steven E. Stupp

(57) ABSTRACT

Embodiments of a synchronization circuit are described. This synchronization circuit includes multiple selectively coupled synchronization stages which are configurable to synchronize data and control signals between a first time domain and a second time domain, where the synchronization can be performed based on asynchronous or synchronous events associated with either the first time domain or the second time domain. Additionally, the synchronization circuit includes control logic, coupled to the synchronization stages, which is configured to adapt a number of synchronization stages used to synchronize the data and the control signals based on an estimate of a probability of metastability persisting to an output of the synchronization circuit during the synchronization.

20 Claims, 18 Drawing Sheets

(56) References Cited

OTHER PUBLICATIONS

Cummings, C. E. and Alfke, P., "Simulation and Synthesis Techniques for Asynchronous FIFO Design with Asynchronous Pointer Comparisons", SNUG-2002, San Jose, CA, www.sunburst-design.com/papers, pp. 1-18.

Dobkin, R., Ginosar, R., and Sotiriou, C., "Data Synchronization Issues in GALS SoCs", 10th International Symposium on Asynchronous Circuits and Systems, Apr. 19-23, 2004, pp. 170-179.

Kinniment, David J., "Synchronization and Arbitration in Digital Systems", Chaper 7, pp. 105-141, 2007,John Wiley & sons, Ltd.

Molnar, C. E., Jones, I. W., Coates, W. S., and Lexau, Jon K., "A FIFO Ring Performance Experiment", Third International Symposium on Advanced Research in Asynchronous Circuits and Systems, Apr. 7-10, 1997, pp. 279-289.

Seizovic, Jakov N., "Pipeline Synchronization", International Symposium on Advanced Research in Asynchronous Circuits, Nov. 3-5, 1994, pp. 87-96.

Sjorgren, A. E., and Myers, C. J., "Interfacing Synchronous and Asynchronous Modules Within a High-Speed Pipeline", IEEE Transactions on VLSI, vol. 8, No. 5, Oct. 2000, pp. 573-583.

* cited by examiner

ADAPTIVE SYNCHRONIZATION CIRCUIT

CROSS REFERENCE TO RELATED APPLICATIONS

This application claims priority under 35 U.S.C. section 119(e) to U.S. Provisional Application Ser. No. 61/076,994, entitled "Adaptive Synchronization Circuit," filed on Jun. 30, 2008, the contents of which are herein incorporated by reference.

BACKGROUND

1. Field of the Invention

The present invention relates to circuits and techniques for synchronizing signals. More specifically, the present invention relates to circuits and techniques for adaptively synchronizing signals between different time domains.

2. Related Art

Clock signals are often distributed over an entire integrated circuit. However, as the clock frequencies and the number of transistors on an integrated circuit increases, it becomes increasingly difficult to implement such global clocks. Moreover, integrated circuits commonly contain different functional blocks that operate at different speeds. Consequently, many integrated circuits include multiple timing domains. In such integrated circuits, synchronizers are often used to interface the different timing domains.

FIG. 1 shows an existing system 100 in which data 116 is communicated between timing domains 110 by transmitter 112 and receiver 114, and wherein synchronizers 118 are used to synchronize the different timing domains 110. When the transmitter 112 wants to transmit data to the receiver 114, it sends the data 116 and a request 124 signal, which is synchronized to the clock of receiver 114 (clk_receiver 126) before being read by the receiver 114. Once the receiver 114 has read the data 116, it sends an acknowledge 122 signal, which is synchronized to the clock of transmitter 112 (clk_transmitter 120). Unfortunately, this synchronization technique often suffers from a large latency because of the synchronization overhead in both the request and acknowledge paths.

Furthermore, many synchronizers, such as synchronizers 118, have fixed configurations, such as synchronizers that include a fixed number of flip-flop stages. This can be problematic because a fixed synchronizer configuration can lead to problems with metastability, in which the output state of one or more flip-flops or the synchronizer becomes unpredictable. In particular, if data is clocked at a slow rate, i.e., if there is enough settling time, synchronizers that have a fixed configuration can provide a very small failure probability, such as $10^{-30}$. However, as clock frequencies increase there may not be enough settling time, and, for a given gate delay in the flip-flops, metastability can occur.

For example, a typical flip-flop from a standard cell library may have a time-constant of two or three times a gate delay. For a 65 nm CMOS-process technology with a 20-ps gate delay, this time-constant may be 60 ps. In such a process, a two flip-flop synchronizer with a 100 MHz clock may have a failure probability of roughly $10^{-160}$ per synchronization event, which is unnecessarily conservative. However, with a 2 GHz clock, the failure probability may increase to $10^{-7}$, which is too large for many applications.

Therefore, integrated circuits that include very different timing domains may impose very conservative design constraints on synchronizers to prevent metastability, which can significantly increase synchronization latency, as well as the cost and expense of these integrated circuits. Moreover, these problems may be compounded when the integrated circuit includes circuits that operate at very different speeds depending on the jobs or tasks being performed.

Hence, what is needed are circuits and techniques for synchronizing signals without the problems described above.

SUMMARY

One embodiment of the present invention provides a synchronization circuit that includes multiple selectively coupled synchronization stages which are configurable to synchronize data and control signals between a first time domain and a second time domain, where the synchronization can be performed based on asynchronous or synchronous events associated with either the first time domain or the second time domain. Additionally, the synchronization circuit includes control logic, coupled to the synchronization stages, which is configured to adapt a number of synchronization stages used to synchronize the data and the control signals based on an estimate of a probability of metastability persisting to an output of the synchronization circuit during the synchronization.

In some embodiments, data input to the synchronization circuit and data output from the synchronization circuit are in the digital domain.

In some embodiments, the synchronization circuit is configured to adapt a synchronization latency of the synchronization circuit without changing other functions of the synchronization circuit.

Moreover, the synchronization circuit may be configured to adapt the number of synchronization stages once (for example, during a one-time initialization procedure or operation mode). Additionally, the synchronization circuit may be configured to adapt the number of synchronization stages dynamically. For example, the synchronization circuit may be configured to adapt the number of synchronization stages based on changes to an operating frequency in either the first time domain or the second time domain.

In some embodiments, the synchronization circuit is configured to adapt the number of synchronization stages using input steering and/or output steering.

In some embodiments, the synchronization stages include flip-flops. Moreover, the synchronization stages may comprise a FIFO buffer.

In some embodiments, the synchronization circuit is used for inter-chip communication and/or for intra-chip communication.

In some embodiments, the synchronization circuit only includes circuits in a standard-cell library.

Moreover, the synchronization circuit may include multiple FIFO stages. A given FIFO stage may include an instance of the multiple selectively coupled synchronization stages.

Furthermore, the given FIFO stage may include: a put control interface, a data-storage element, and a get control interface, where the given FIFO stage may be configured to sequentially pass a put token between the put control interfaces in the FIFO stages and may be configured to sequentially pass a get token between the get control interfaces in the FIFO stages. Furthermore, if the put control interface contains the put token and the data-storage element is empty, data may be received from the first time domain, and/or if the get control interface contains the get token and the data-storage element is full, data may be provided to the second time domain.

In some embodiments, the synchronization stages include asymmetric synchronization elements in the put interface.

The asymmetric synchronization elements are configured to provide a first synchronization latency for events received from the first time domain of the transmitter in response to a put operation and are configured to provide a second synchronization latency, which is larger than the first synchronization latency, for events received from the second time domain of the receiver in response to a get operation. Moreover, in some embodiments, the synchronization stages include asymmetric synchronization elements in the get interface.

In some embodiments, control signals from the asymmetric synchronization elements associated with the put control interfaces in the FIFO stages are logically combined to provide an okay-to-put control signal which is only enabled when at least one data-storage element is guaranteed to be empty, thereby ensuring proper operation of the synchronization circuit. Moreover, control signals from the asymmetric synchronization elements associated with the get control interfaces in the FIFO stages may be logically combined to provide an okay-to-get control signal which is only enabled when the at least one data-storage element is guaranteed to be full, thereby ensuring proper operation of the synchronization circuit.

In some embodiments, outputs from synchronizers in the put interfaces in the FIFO stages are logically combined to provide the okay-to-put control signal and/or outputs from synchronizers in the get interface in the FIFO stages are logically combined to provide the okay-to-get control signal.

In some embodiments, the synchronization circuit is disposed on an integrated circuit.

Another embodiment provides a computer system or another digital system (which may or may not be programmable) that includes the integrated circuit.

Another embodiment provides a computer-readable medium containing data representing the synchronization circuit.

Another embodiment provides a method for synchronizing signals.

BRIEF DESCRIPTION OF THE FIGURES

Note that like reference numerals refer to corresponding parts throughout the drawings.

DETAILED DESCRIPTION

Figure 1:
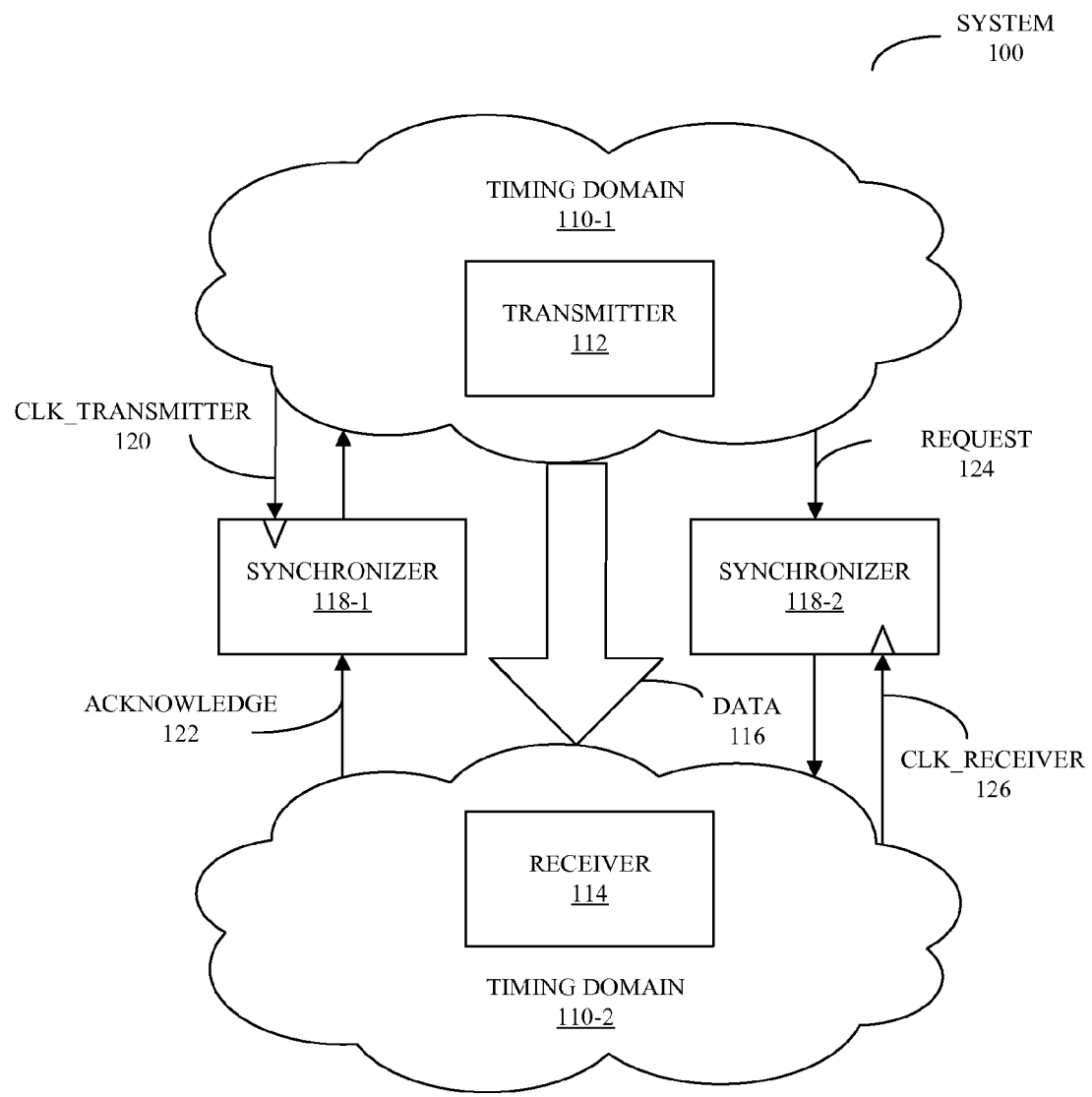
FIG. 1 is a block diagram illustrating an existing system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a synchronization first-in first-out (FIFO) circuit (or synchronization FIFO), an integrated circuit that includes the synchronization FIFO, a computer system that includes the integrated circuit, and a process for synchronizing signals are described. This synchronization FIFO includes multiple selectively coupled synchronization stages which are configurable to synchronize data (such as digital data) and control signals between two time domains. Note that the synchronization can be performed based on asynchronous or synchronous signaling protocols associated with either time domain. Moreover, the synchronization FIFO can include control logic, coupled to the FIFO stages, that can adapt a number of synchronization stages used to synchronize the data and the control signals based on an estimate of a probability of metastability persisting to an output of the synchronization circuit during the synchronization. Additionally, the synchronization FIFO may adapt a synchronization latency of a synchronizer in the synchronization FIFO without changing the control logic.

In some embodiments, the FIFO stages include asymmetric synchronization elements, where the asymmetric synchronization elements provide a first synchronization latency when an input event originates from the same time domain as that of the output of the asymmetric synchronization element, and are configured to provide a second synchronization latency, which is larger than the first synchronization latency, when an input event originates from another time domain that is asynchronous with respect to the time domain of the output of the asymmetric synchronization element.

In some embodiments, the synchronization FIFO adapts the number of synchronization stages using input steering and/or output steering, which can provide integer or fractional clock-period synchronization latencies. For example, some embodiments provide synchronizer latencies that are integer multiples of half the clock period, while other embodiments could provide other possible values for the synchronizer latencies. Moreover, the synchronization FIFO may be used for inter-chip communication and/or for intra-chip communication.

This synchronization FIFO may be used to synchronize signals between different time domains in a wide variety of electronic devices, including: a server, a laptop computer, a personal computer, a work station, a mainframe computer, a computing device or system capable of manipulating computer-readable data, a digital signal processor, a portable-computing device, a personal organizer, a cellular telephone, a personal digital assistant, a game console, an MP3 player, a device controller, and/or a computational engine within an appliance. Note that the computing system may be at a single location or may be a distributed system, such as one in which two or more computing devices communicate information with each other over a network (such as the Internet and/or an intranet).

We now describe embodiments of a synchronization FIFO. This synchronization FIFO can provide a low-latency, high-throughput, standard-cell based implementation of a synchronization FIFO that can synchronize different timing domains. Moreover, these timing domains may be synchronous or asynchronous, i.e., clocked or clockless.

Figure 2:
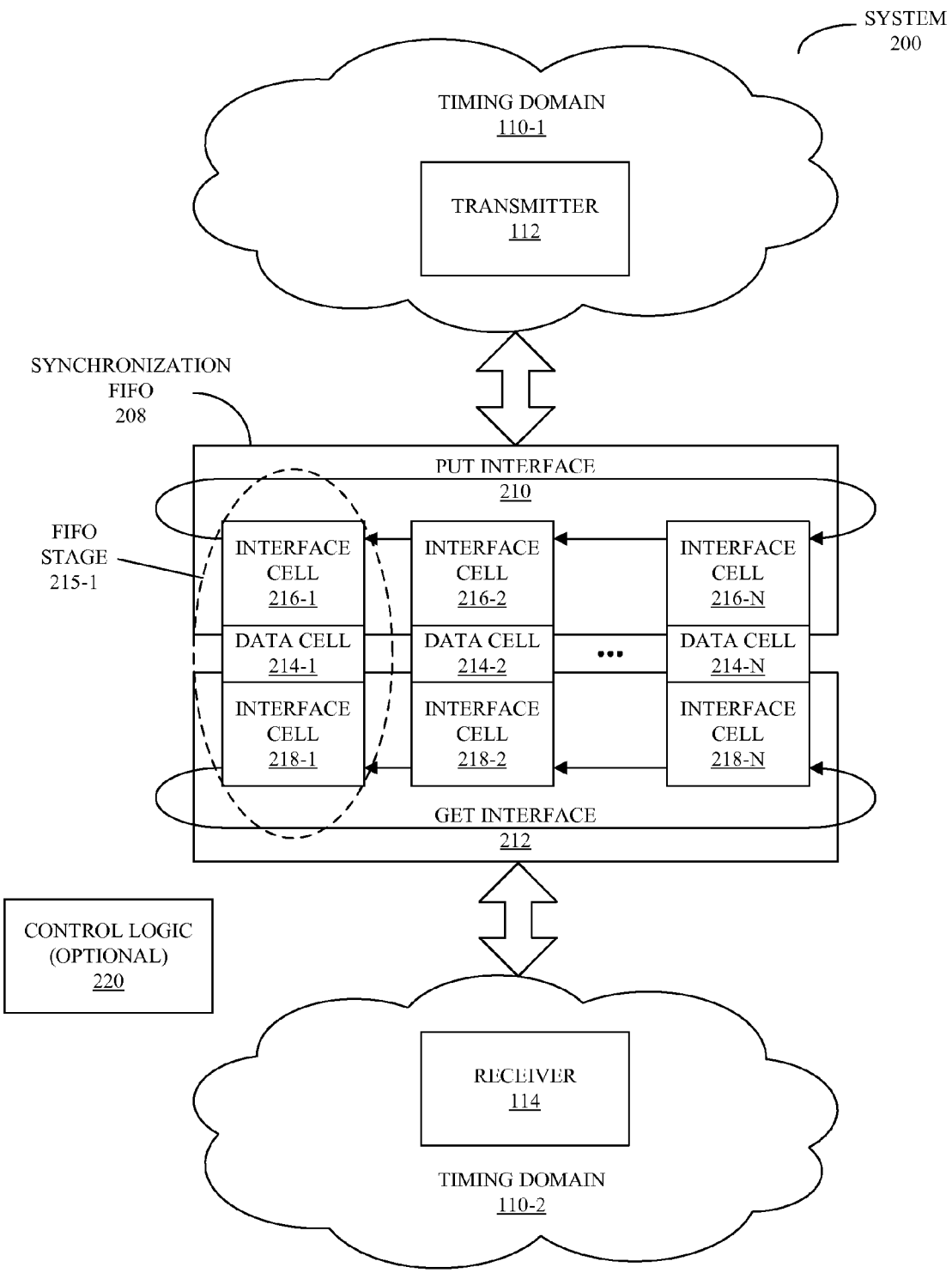
FIG. 2 is a block diagram illustrating a system in accordance with an embodiment of the present invention.

FIG. 2 presents a block diagram illustrating a system 200. In this system, transmitter 112 in timing domain 110-1 communicates with the receiver 114 in timing domain 110-2 via a synchronization FIFO 208 that includes n data-cell stages 214 in n FIFO stages (such as FIFO stage 215-1), where a given data cell includes a data holding element (such as register 716-1 in FIG. 7A) and a data validity controller (such as data validity controller 600 in FIG. 6). Note that, in some embodiments, the number of FIFO stages may be less than 10. However, in other embodiments it may be greater than or equal to 10.

During this communication, the transmitter 112 interacts with put interface 210, and the receiver 114 interacts with get interface 212. These interfaces respectively include individual interface cells 216 and 218 which are located in each of the FIFO stages (such as FIFO stage 215-1). Moreover, interface cells 216 exchange a put token that determines which of the FIFO stages services the next put request from transmitter 112. During operation of the synchronization FIFO 208, this put token is passed from FIFO stage to FIFO stage with each put request. Similarly, a get token is exchanged between interface cells 218 with each get request.

Interface cells 216 and 218 can be either synchronous and/or asynchronous. Moreover, synchronization FIFO 208 is modular such that different types of interfaces can be combined, e.g., a clocked put interface and an asynchronous get interface (as described further below with reference to FIG. 18).

In some embodiments, synchronization FIFO 208 has a variety of features, including: the ability to interface with both synchronous and asynchronous timing domains using standard cells, such as those provided by one or more integrated-circuit manufacturers or circuits used in multiple designs by multiple designers (either of which facilitates inclusion of this synchronization FIFO in a standard CAD flow); the asynchronous interfaces can implement an asynchronous symmetric pulse protocol (asP*) handshake; a simple transparent latch can be used as a half-cycle synchronizer for the synchronous interfaces (which may provide a sufficient mean time between failure or MTBf); the use of one standard cell as a synchronizer that makes the characterization of the MTBF of the synchronization FIFO simple and independent of the particular layout of the synchronization FIFO 208; and/or asymmetric latency depending on whether the last operation was a read or a write.

Moreover, optional control logic 220 may be used to adapt the latency of the synchronizer circuits that are used to synchronize the control signals which are communicated between time domains 110 based on an estimate of the probability of metastability persisting to the output of the synchronization FIFO during the synchronization (for example, to reduce a probability of metastability failure).

Figure 3:
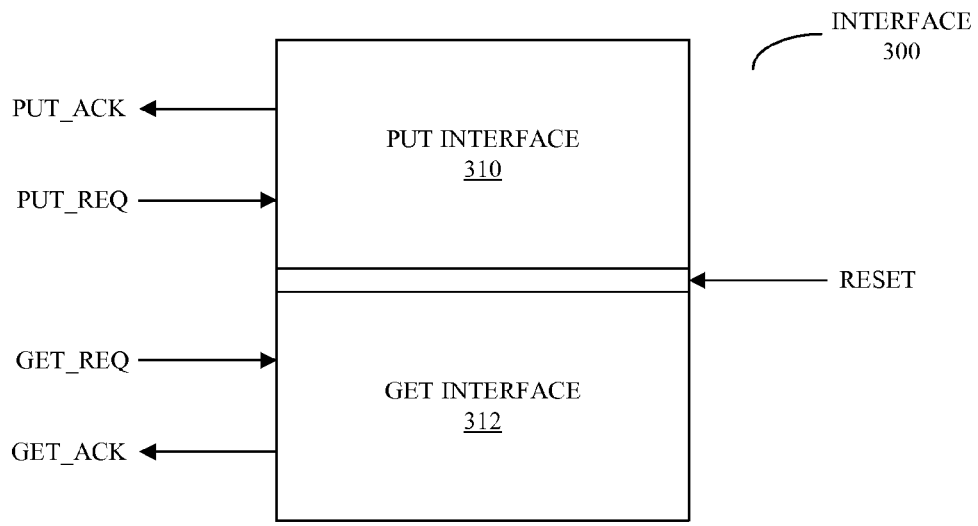
FIG. 3 is a block diagram illustrating an interface circuit in accordance with an embodiment of the present invention.

We now describe asynchronous interfaces. For purposes of illustration, the asynchronous interfaces implement an asP*-style protocol. FIG. 3 presents a block diagram illustrating an interface circuit 300, which shows the inputs and outputs of asynchronous put interface 310 and get interface 312. A transmitter issues put requests on a put_req input and receives acknowledgments on put_ack. Similarly, requests to read from a receiver are issued on a get_req input and are acknowledged through a get_ack signal. Moreover, these interfaces can be initialized using a reset signal.

Figure 4:
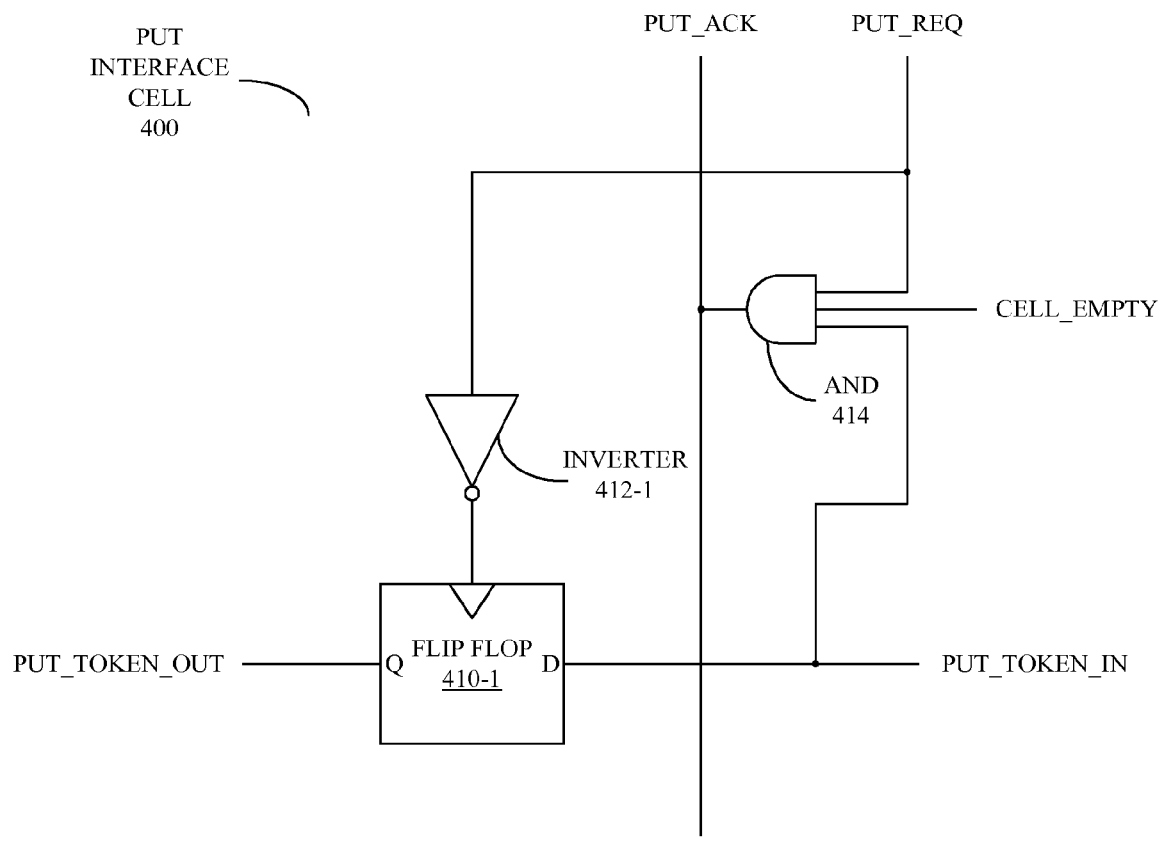
FIG. 4 is a block diagram illustrating a put interface cell in accordance with an embodiment of the present invention.

An asynchronous put interface cell is shown in FIG. 4, which presents a block diagram illustrating a put interface cell 400. Note that an n-FIFO stage synchronization FIFO 208 has n of these cells, one for each FIFO stage. In this interface cell, input port put_token_in and output port put_token_out are used to receive and to pass the put token. Because only one put cell in the synchronization FIFO 208 can have the put token at any given time, it is equivalent to a write pointer pointing to a particular FIFO stage.

Signal cell_empty is high if the data holding element in put interface cell 400 is empty and, hence, a put request can be accommodated. Moreover, requests to put a new data item arrive on the put_req port. If put interface cell 400 holds the put token and cell_empty is high, the put_ack signal (or, the write signal) is asserted.

Figure 7A:
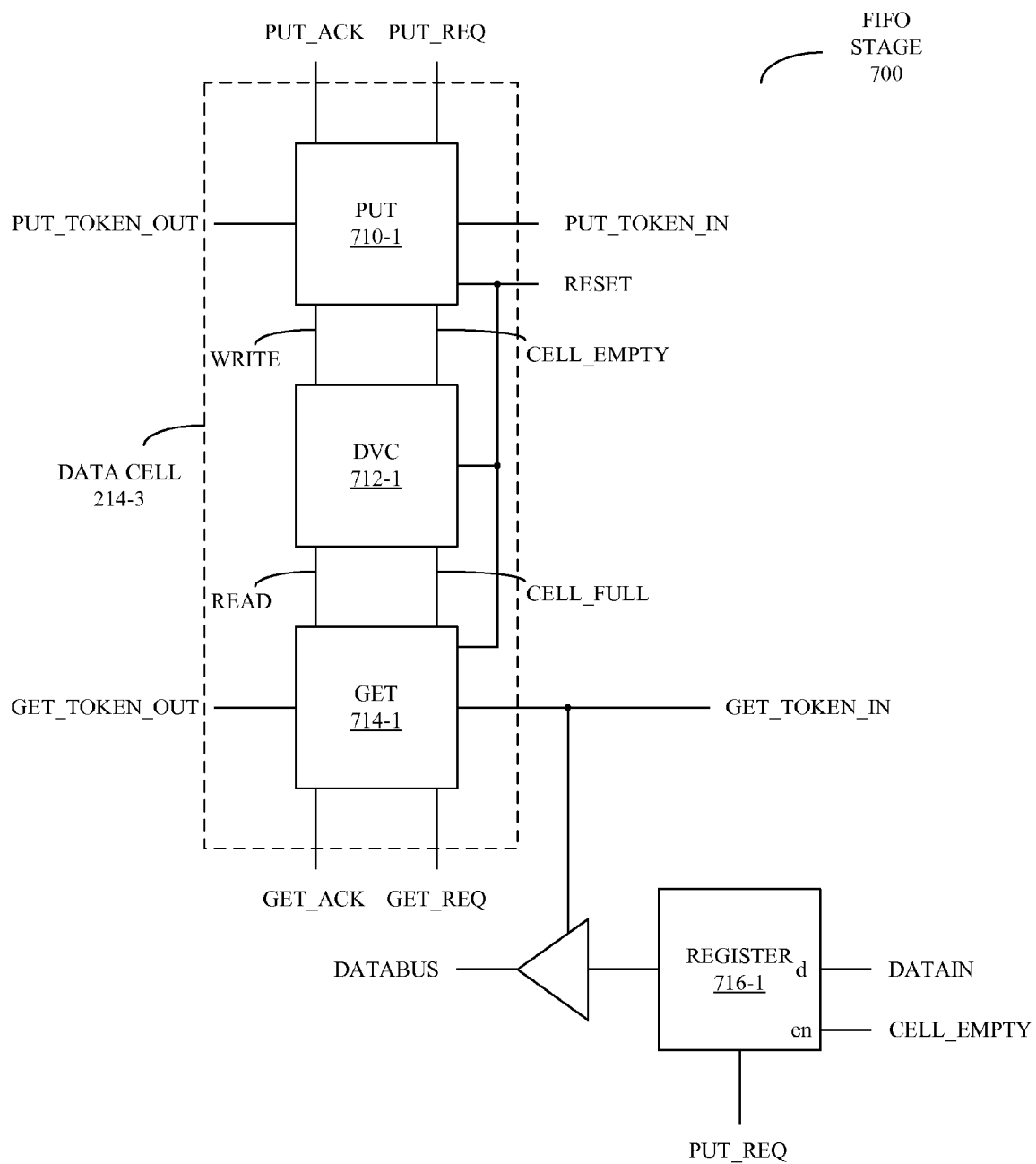
FIG. 7A is a block diagram illustrating a FIFO stage in accordance with an embodiment of the present invention.

Note that the cell_empty signal falls in response to the assertion of write (as described further below with reference to FIG. 7A). In response to the rising edge of put_ack, the transmitter drops put_req based on the asP*-handshake protocol. This triggers the flip-flops (such as flip-flop 410-1) in all of the put interfaces, which then pass the put token to the interface cell to the left. (In particular, flip-flop 410-1 may be triggered by the inverse of put_req, which is provided by inverter 412-1.) At this point, all three inputs to AND gate 414 that produce put_ack/write are low, and put interface cell 400 drops put_ack, completing the asP* handshake.

During operation of put interface cell 400, if a put request arrives when the interface cell is empty (cell_empty is high) and the interface cell holds the put token, put_ack rises in response. This signals to the transmitter that the request is being granted and also causes cell_empty to fall. (Note that this happens in a different cell, the data validity controller, which is described below with reference to FIG. 6.) Moreover, once cell_empty is low, the acknowledge signal drops as well. Then, the asP* handshake in the transmitter causes put_req to fall in response to the rising transition on put_ack, which enables the put token to be passed to the next interface cell.

Figure 5:
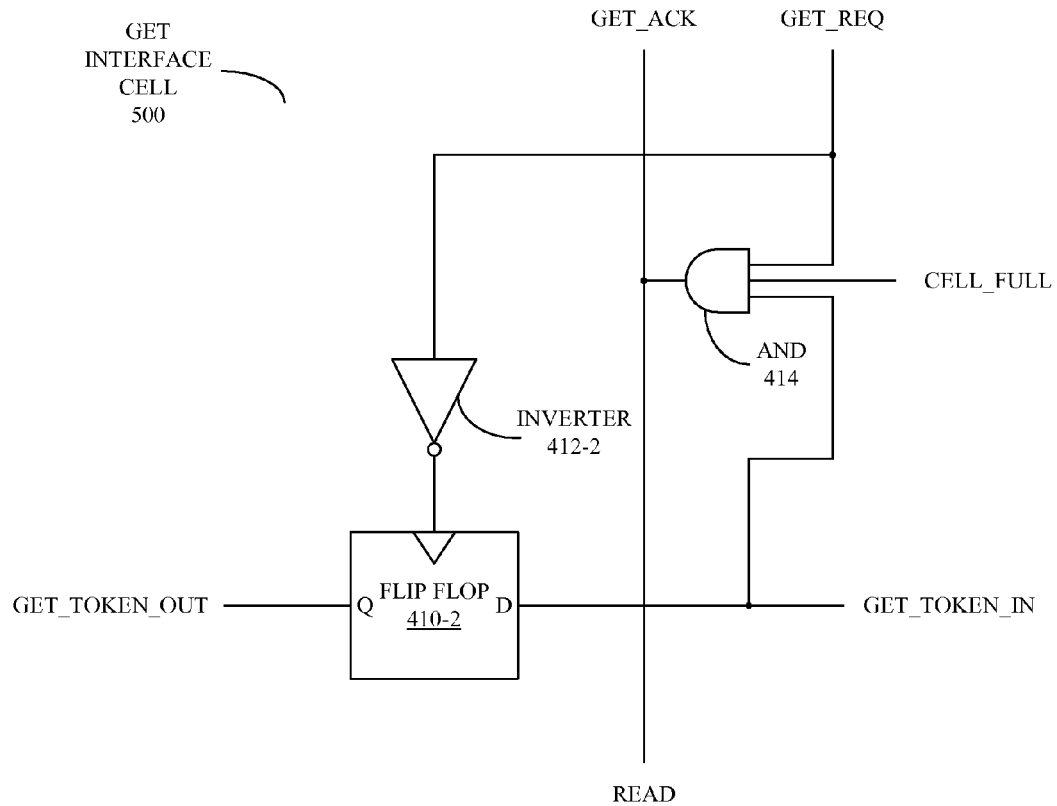
FIG. 5 is a block diagram illustrating a get interface cell in accordance with an embodiment of the present invention.

Get interface cell 500 in FIG. 5 illustrates the get interface circuit. This interface cell is identical to the put interface, but instead of checking if the FIFO stage is empty, it checks if it is full. Moreover, get interface cell 500 issues a read signal rather than a write signal. This read signal can be used to latch data output (as described further below with reference to FIG. 7B).

Figure 6:
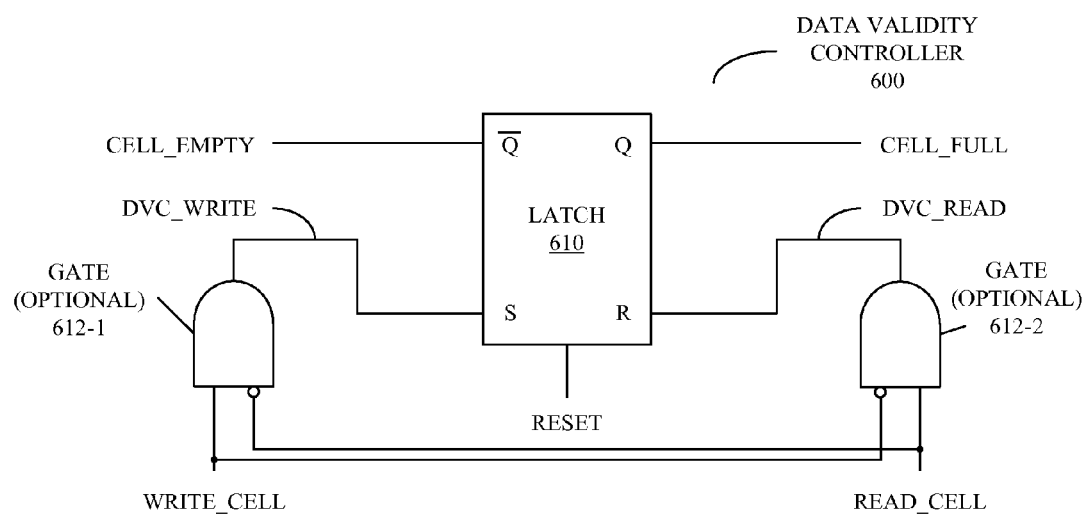
FIG. 6 is a block diagram illustrating a data validity controller in accordance with an embodiment of the present invention.

Additionally, each FIFO stage in the synchronization FIFO may have a data validity controller (DVC) cell associated with it. Data validity controller 600, which is shown in FIG. 6, keeps track of whether the FIFO stage is empty or full. This data validity controller cell includes a latch 610, such as an SR latch, and two optional gates 612. Latch 610 is set by a write operation from the put interface and is reset by a read operation from the get interfaces. Note that optional gates 612 ensure that the set and reset inputs of latch 610 are not both high at the same time.

These various cells may be combined into an asynchronous FIFO stage. This is shown in FIG. 7A, which presents FIFO stage 700. This FIFO stage includes put interface cell 710, get interface cell 714, data-validity-controller cell (DVC) 712 and a data register 716-1 (such as a latch or a flip-flop, which can store one word). Note that register 716-1 has the cell_empty signal as an enable signal. However, in other embodiments, a different enable signal may be used, such as the logical AND of cell_empty and get_token_in. In an exemplary embodiment, there are eight data latches, which hold data that have been inserted into and not yet removed from the FIFO. Moreover, note that datain, databus, reset, get_req and put_req are the same for each FIFO stage, but there are separate instances of cell_empty, cell_full, get_ack, get_token_in, get_token_out, put_ack, put_token_in, put_token_out, read and write for each FIFO stage. Furthermore, each FIFO stage may include a data register, such as data register 716-1, but output from the tristate buffers in the FIFO stages may all be electrically coupled to a common databus.

Figure 7B:
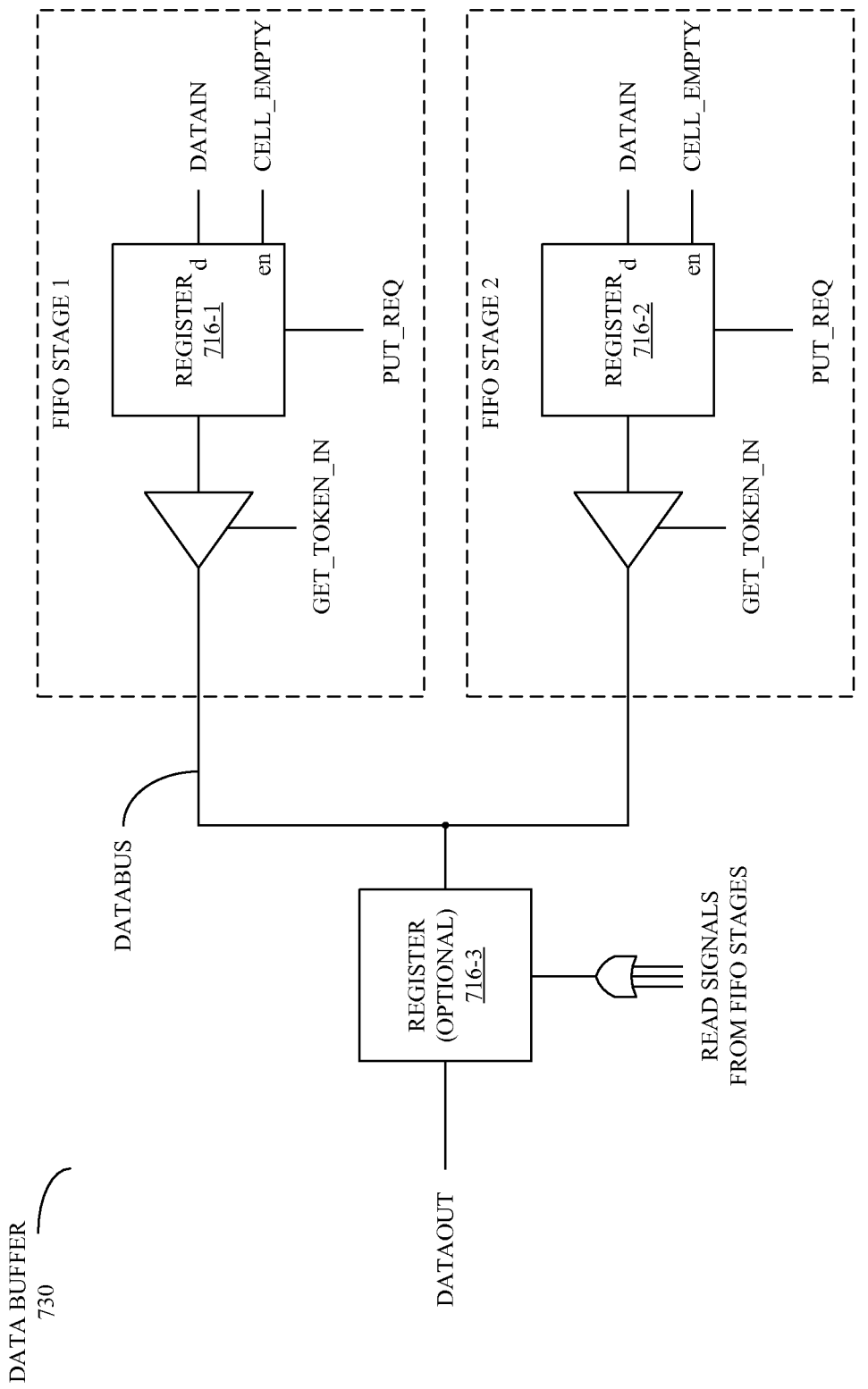
FIG. 7B is a block diagram illustrating a data register in accordance with an embodiment of the present invention.

Data registers for two FIFO stages are shown in FIG. 7B, which presents a data register 730. Note that dataout may be latched based on the logical OR of the read signals from the FIFO stages.

Note that a synchronization FIFO of length n with m data bits can be constructed by chaining n of these stages in a loop and using m data latches. However, the synchronization-FIFO length may affect the load on request signals, and the put and get acknowledge signals may be obtained using OR gates 760 in a tree of height log(n). The tree implementation is mentioned as an example of a possible embodiment. Other implementations of this logical OR function that may improve the performance of the design for some synchronization FIFO sizes will be apparent to one skilled in the art. By logically combining the get acknowledge signals, this signal is only enabled when the at least a portion of the data latches (and, more generally, the data-storage registers) is truly empty, thereby ensuring proper operation of the synchronization FIFO 750. Similarly, by logically combining the put acknowledge signals, this signal is only enabled when the at least a portion of the data latches is truly full, thereby ensuring proper operation of the synchronization FIFO 750.

Figure 8:
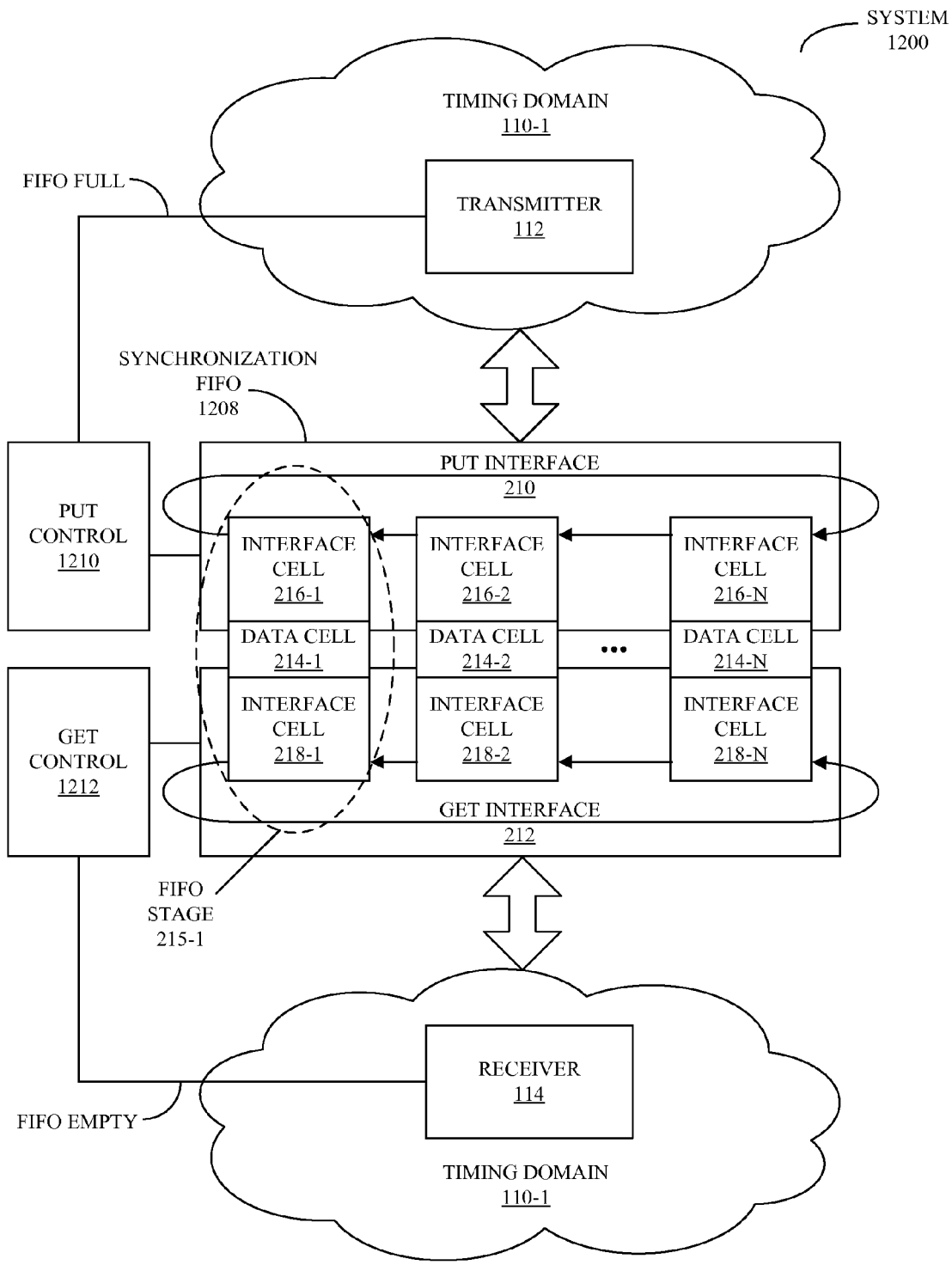
FIG. 8 is a block diagram illustrating a system in accordance with an embodiment of the present invention.

We now describe synchronous interfaces. FIG. 8 presents a block diagram illustrating a system 1200. Unlike the asynchronous interfaces, the synchronous interfaces in synchronization FIFO 1208 include a control block that keeps track of the fullness of the synchronization FIFO and signals to the transmitter 112 when the synchronization FIFO is full (put control 1210) and to the receiver 114 when it is empty (get control 1212). This control block will be described below in the discussion of controller 1600 in FIG. 12. Moreover, the synchronous interfaces use synchronizers to ensure reliable operation in the presence of possible metastability (as described below with reference to FIGS. 13, 14 and 17).

Figure 9:
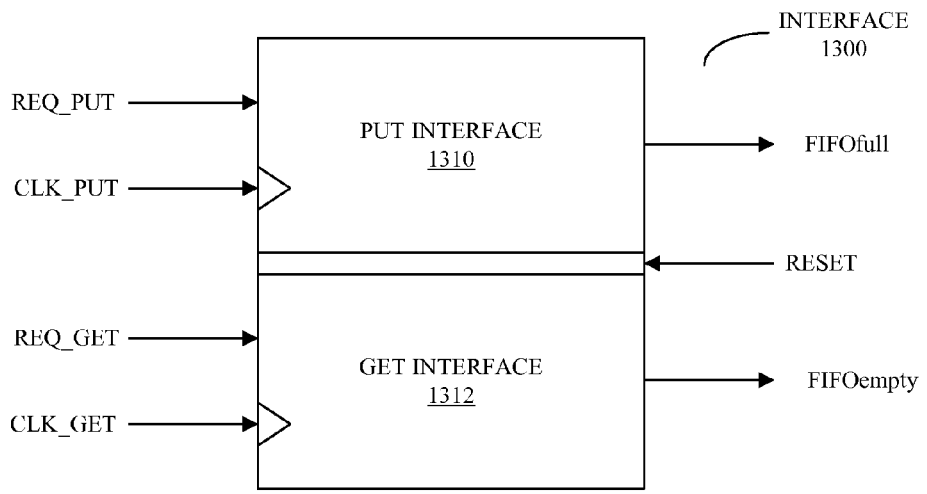
FIG. 9 is a block diagram illustrating an interface circuit in accordance with an embodiment of the present invention.

Interface circuit 1300 in FIG. 9 illustrates synchronous put interface 1310 and get interface 1312. Inputs to the put interface 1310 are put clock and put request signals, clk_put and req_put, and the output is signal FIFOfull. Similarly, get interface 1312 has as inputs the get clock and get request signals, clk_get and req_get, and as output signal FIFOempty. Both interfaces also use a reset signal for initialization. Note that transmitter and receiver may issue a request to write or read data by raising req_put or req_get sufficiently before the rising edge of the corresponding clock. However, the transmitter may only raise req_put when FIFOfull is not asserted. Similarly, the receiver may only raise req_get when FIFOempty is not asserted. On the first rising clock edge after the request, data is either written to or read from the synchronization FIFO. Note that, once again, data bus and the data holding elements (such as latches) are omitted for clarity. In some embodiments, these components are positive edge-triggered flip-flops.

Figure 10:
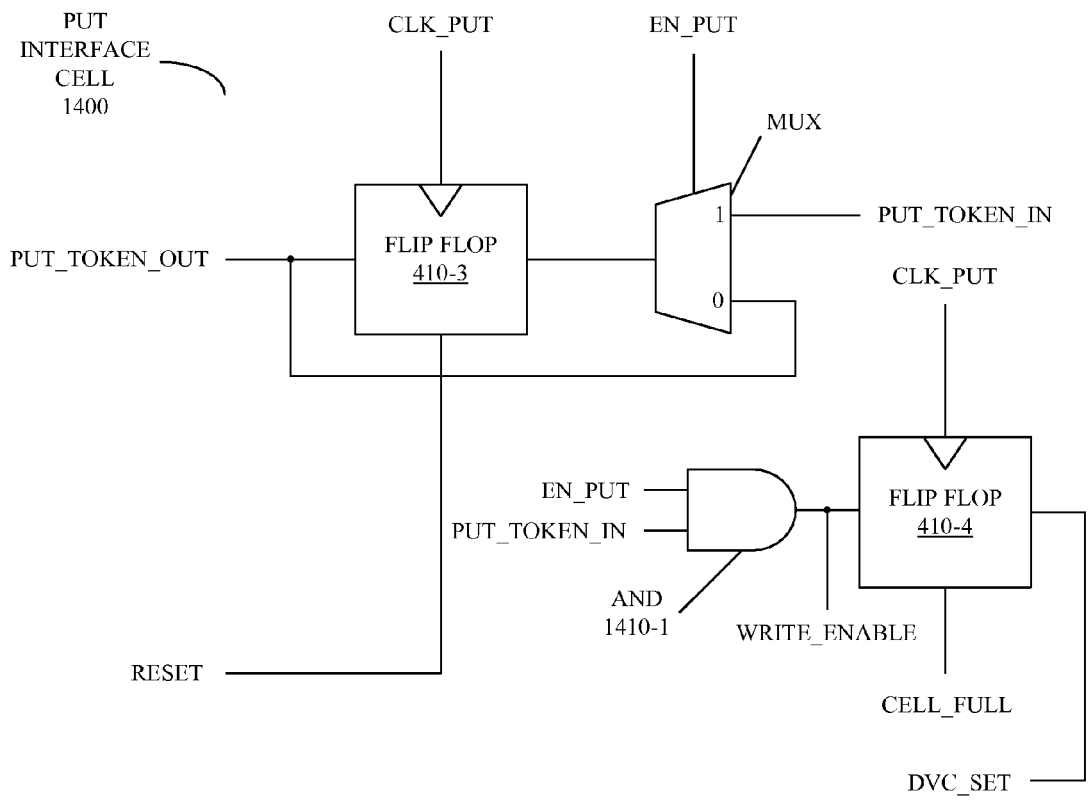
FIG. 10 is a block diagram illustrating an put interface cell in accordance with an embodiment of the present invention.

A synchronous put interface cell is shown in FIG. 10, which presents a block diagram illustrating a put interface cell 1400. As in the asynchronous case, each FIFO stage has one put and one get interface cell. Note that the reset signal is used during initialization and sets the put_token_out output to high for one cell and low for all other cells. Moreover, signal en_put is controlled by the request signal from the transmitter and by the put controller, which is described below with reference to FIG. 12.

If en_put is asserted, it means that the transmitter issued a send request and that the synchronization FIFO is not full and can accommodate the new data. If put_token_in is high, put interface cell 1400 holds the token. Once again, only one interface cell can have a token at any given time. If put interface cell 1400 holds the token, then the write enable signal is issued when en_put is raised. This signal can be used as the enable signal for the data holding elements or latches, which are clocked using clk_put. On the next rising clock edge the token is passed to the left interface cell and signal dvc_set is raised. This signal notifies the data validity controller that data was written and that this stage is now full. Consequently, when signal dvc_set goes high, it eventually leads to cell_full being high, which resets dvc_set to low.

Figure 11:
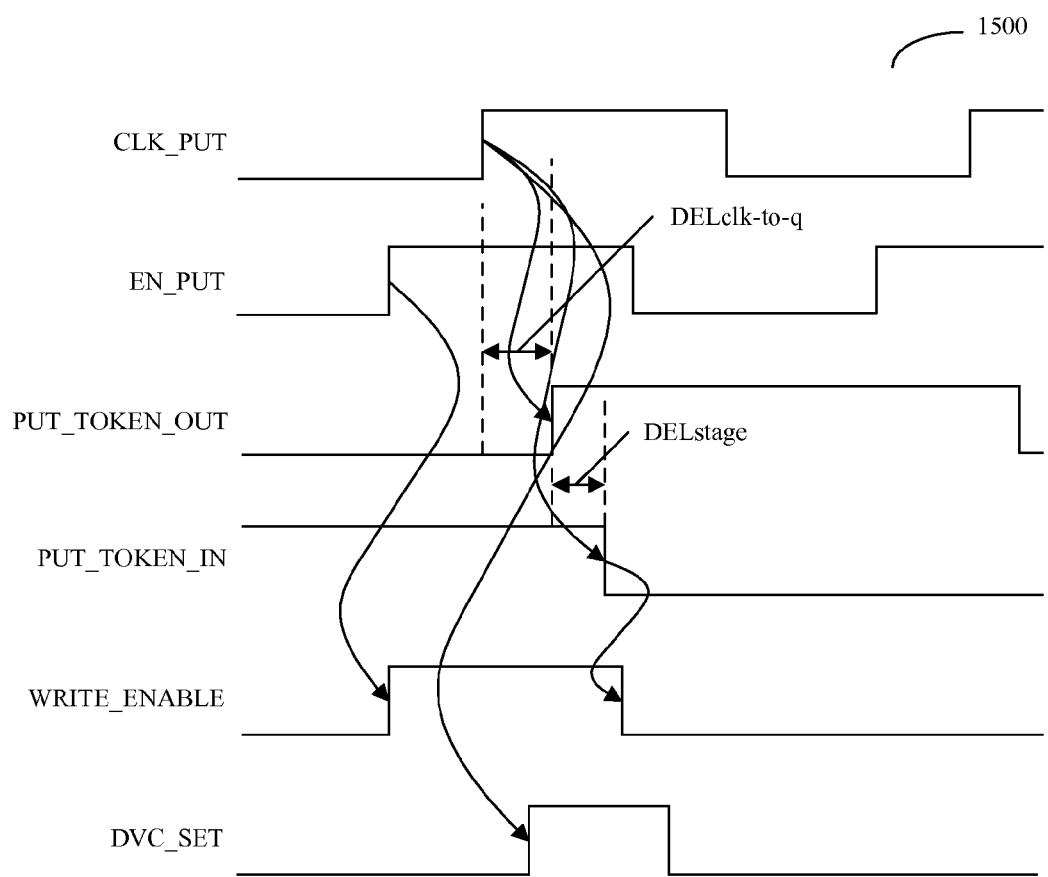
FIG. 11 is a timing diagram illustrating signals in accordance with an embodiment of the present invention.

FIG. 11 presents a timing diagram 1500 of put-interface signals with $del_{clk-to-q}$ defined as the clock-to-q delay of the flop and $del_{stage}$ defined as the propagation delay of the token from one FIFO stage to the next. Note that because write_enable is used as the enable signal for the data holding elements or latches, care may need to be taken to ensure that it meets the hold time requirements for this signal. If necessary, a delay can be added to the put_token_in input of AND gate 1410-1 (FIG. 10), which will slow down the falling edge of write_enable. Note also that the write_enable signal for the next interface cell will be raised once the put token has been passed to that cell, but this happens after the rising clock edge and will not cause data to be latched in that stage. Write_enable is subsequently lowered once en_put is lowered, either by the put controller or by the transmitter.

In some embodiments, the synchronous get interface cell is identical to the synchronous put interface cell, except that it issues read enable signals and responds to read requests. Moreover, the get interface can be modified to allow data to be read from the data bus as soon as a get interface cell has the read token. Then, the read enable signal can be used by the receiver to latch the data from the bus.

Note that the synchronous data-validity-controller cell is similar to the one used in the asynchronous case.

Figure 12:
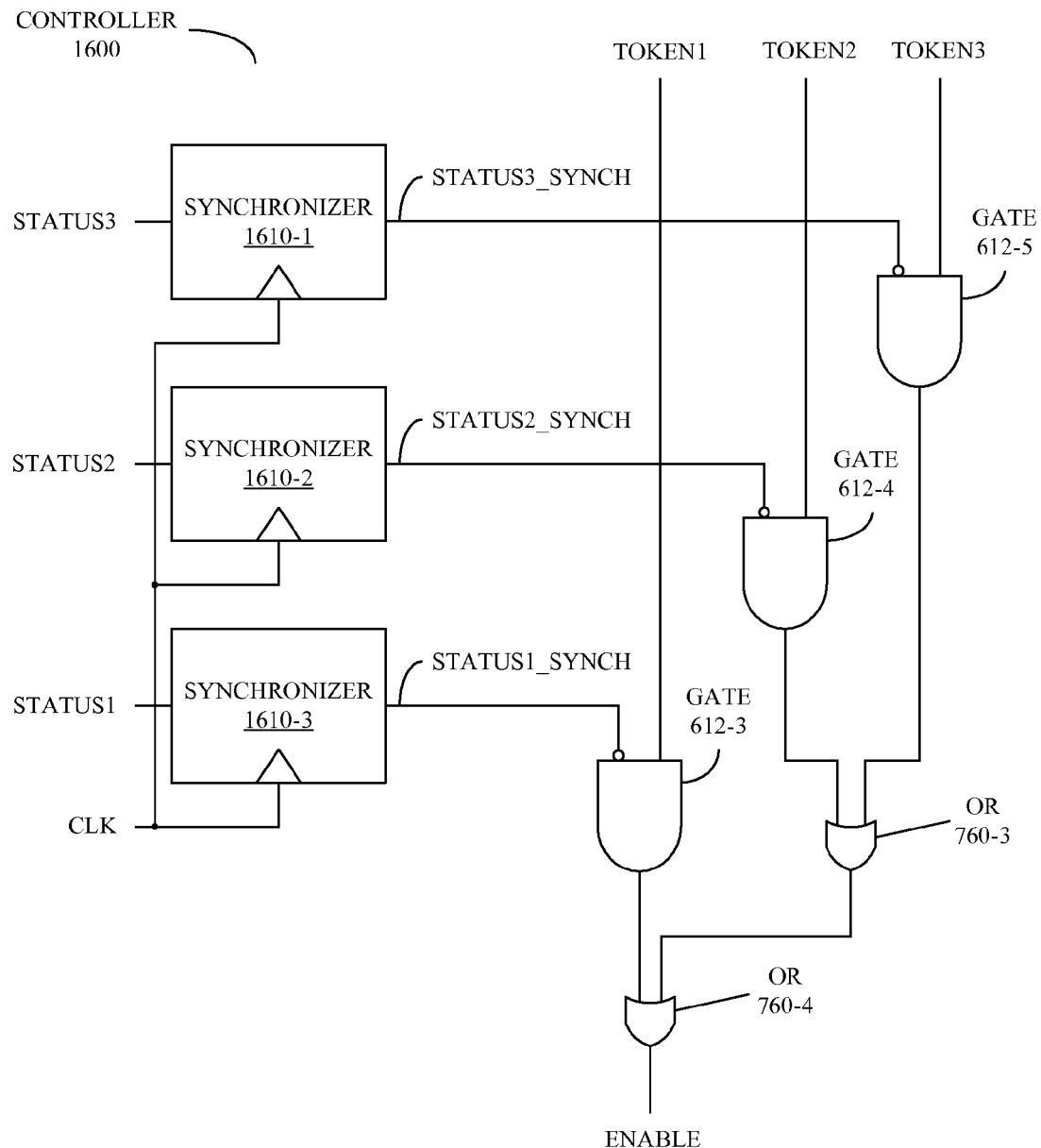
FIG. 12 is a block diagram illustrating a controller in accordance with an embodiment of the present invention.

We now describe the synchronous put and get controllers. The put controller is responsible for allowing data writes to the data cell and preventing overflows, while the get controller ensures that only valid data is read from the data cell. In some embodiments, the same circuit is used as the put and get controller. Moreover, there may be one put controller and one get controller per synchronization FIFO and the controller design depends on the synchronization-FIFO depth. FIG. 12 presents a block diagram illustrating a controller 1600, which is the put and get controller circuit for a three FIFO-stage synchronization FIFO. Inputs to the put controller include the full signals from the data validity controller (the statusi signals) as well as the put token signals (the tokeni signals). Similarly, the inputs to the get controller include the empty signals from the data validity controller as well as the get token signals. Instead of synchronizing the output of the controller to the put or get clock, the signals that change asynchronously to the put or get clock may be synchronized individually. This is the function of synchronizers 1610. While this increases the number of synchronizers 1610 in a synchronization FIFO, it can result in a simpler design that is easily modified to achieve the required MTBF for different clock frequencies or other operating conditions.

Note that synchronizers 1610 may include or comprise shift registers. Moreover, a synchronizer may include one or more synchronization stages. In some embodiments, the synchronization FIFO includes control logic that adapts the number of synchronization stages in, and thus the latency of, a given synchronizer. For example, the number of synchronization stages may be adapted based on an estimate of the probability of metastability persisting to the output of the synchronization FIFO during the synchronization. Note that a given synchronization stage may include one or more latches (each of which, technically, is half of a synchronization stage) or one or more flip-flops. The synchronizer associated with the put and get controller is described below with reference to FIG. 13.

During operation of the put controller, the synchronization FIFO is full if the interface cell holding the put token is full. Conversely, a new datum can be written to the synchronization FIFO if the interface cell holding the put token is empty. So if for any i, tokeni is high and statusi is low, a synchronization-FIFO put can be issued to the synchronization FIFO. These status signals, which in the put controller are connected to the cell_full signals from the data validity controller, are first synchronized to the put clock by synchronizers 1610 before being negated and ANDed with the token signals. Because they are compared only after a synchronization delay, a synchronization-FIFO overflow could happen. However, as long as the synchronization FIFO is deeper than the synchronization delay, a synchronization-FIFO overflow will not occur.

During operation of the get controller, if there is valid data to be read from the synchronization FIFO, the get controller issues an enable. A synchronization-FIFO underflow, where invalid data is read from an empty synchronization FIFO, can occur if the status of an interface cell has changed from full to empty during the synchronization delay time. As in the put controller case, this can be prevented if the synchronization-FIFO depth is greater than the synchronization delay.

Figure 13:
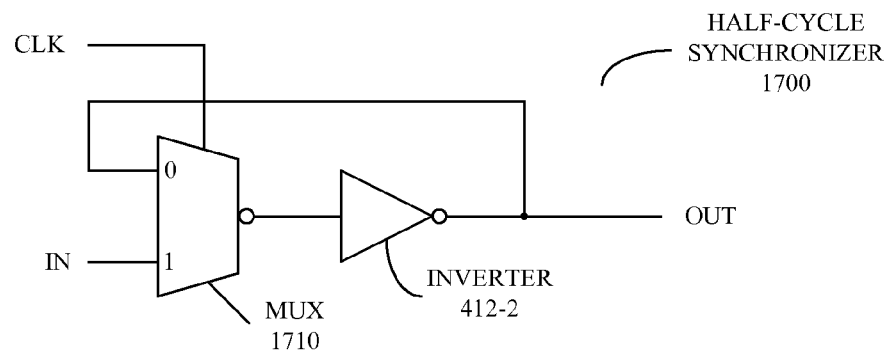
FIG. 13 is a block diagram illustrating a half-cycle synchronizer in accordance with an embodiment of the present invention.
Figure 14:
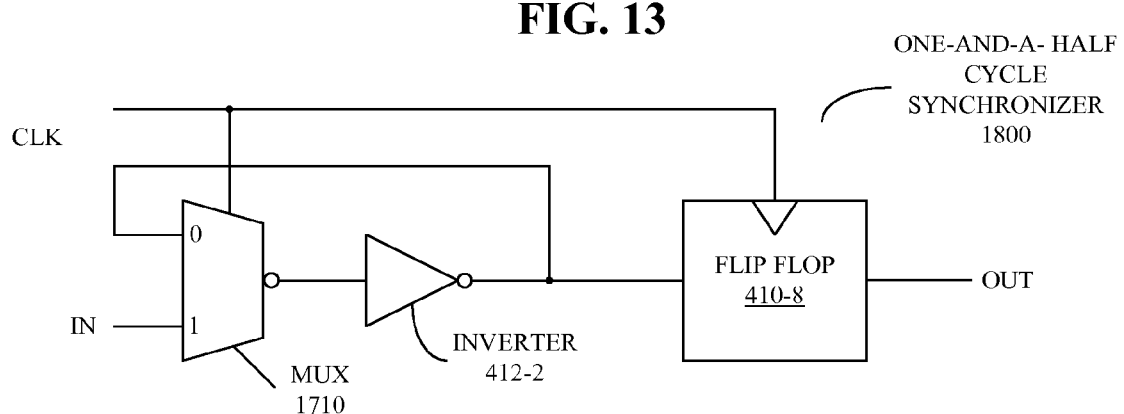
FIG. 14 is a block diagram illustrating a one-and-a-half cycle synchronizer in accordance with an embodiment of the present invention.
Figure 17:
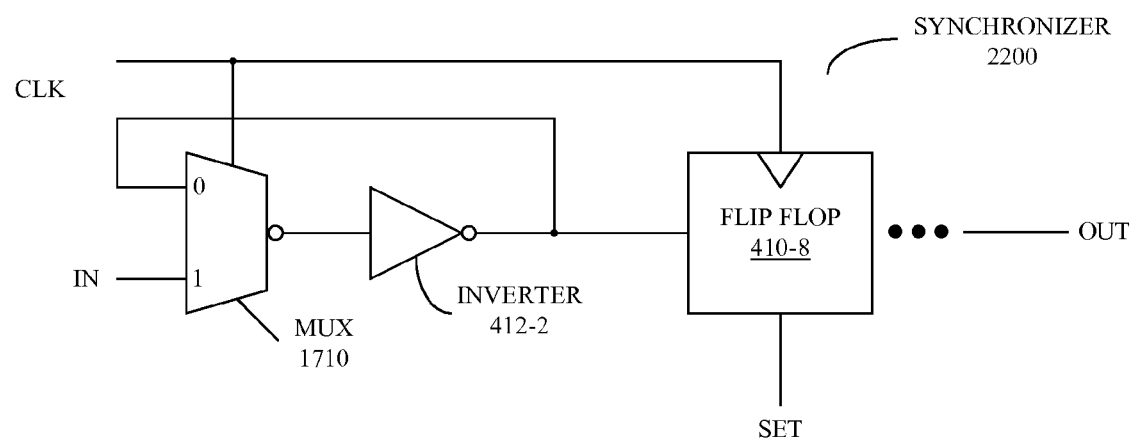
FIG. 17 is a block diagram illustrating a synchronizer in accordance with an embodiment of the present invention.

FIG. 13 presents a block diagram illustrating a half-cycle synchronizer 1700 that can be used by the put and get controller. (While this synchronizer illustrate embodiments of a transparent latch, and one-and-a-half cycle synchronizer 1800 in FIG. 14 and synchronizer 2200 in FIG. 17 illustrate embodiments of a transparent latch and a flip-flop, in other embodiments an arbitrary combination of transparent latches, flip-flops and/or other synchronization elements may be used.) When clock is high, the input is passed to the output. When clock is low, the output is tied back to itself. Thus, this synchronizer allows slightly less than half the clock cycle (the clock low time) for potential metastability to resolve. When using this synchronizer in the controller 1600 (FIG. 12), the synchronizer output passes through some additional gates, shortening the amount of time available to resolve metastability. To further reduce the probability of metastability failure, in some embodiments one or more additional clock cycles may be added to the synchronizer by adding one or more flip-flops to the output, as shown in FIG. 14, which presents a block diagram illustrating a one-and-a-half cycle synchronizer 1800. As noted previously, more synchronizer delay cycles can be added as long as the FIFO depth is greater than the synchronizer delay.

As noted previously, in some embodiments optional control logic 220 (FIG. 2), or put controller 1210 (FIG. 8) and get controller 1212 (FIG. 8), can adapt (one-time, dynamically, or as needed) the latency of the synchronizer based on an estimate of the probability of metastability persisting to the output of the synchronization circuit (such as the synchronizer) during synchronization. For example, this can be accomplished by including additional multiplexers in the design to implement input steering or output steering to change the number of flip-flops and/or latches in each synchronizer. Such control logic or such a controller may adapt the synchronization latency based on changes to an operating frequency in either time domain 110-1 (FIG. 2) or time domain 110-2 (FIG. 2).

Figure 15:
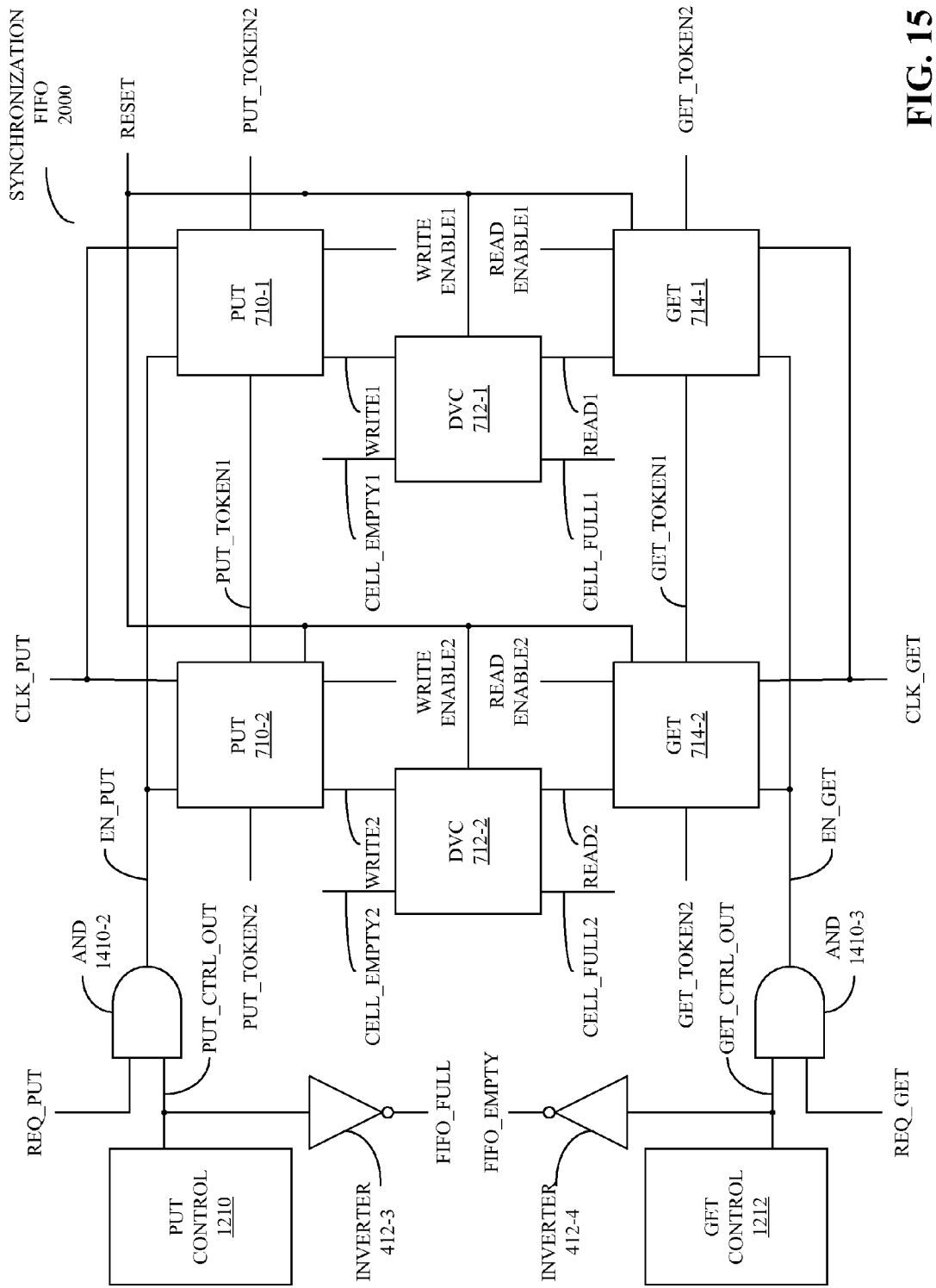
FIG. 15 is a block diagram illustrating a synchronization FIFO in accordance with an embodiment of the present invention.

FIG. 15 presents a block diagram illustrating a synchronization FIFO 2000 with a two FIFO-stage synchronization FIFO.

Figure 16:
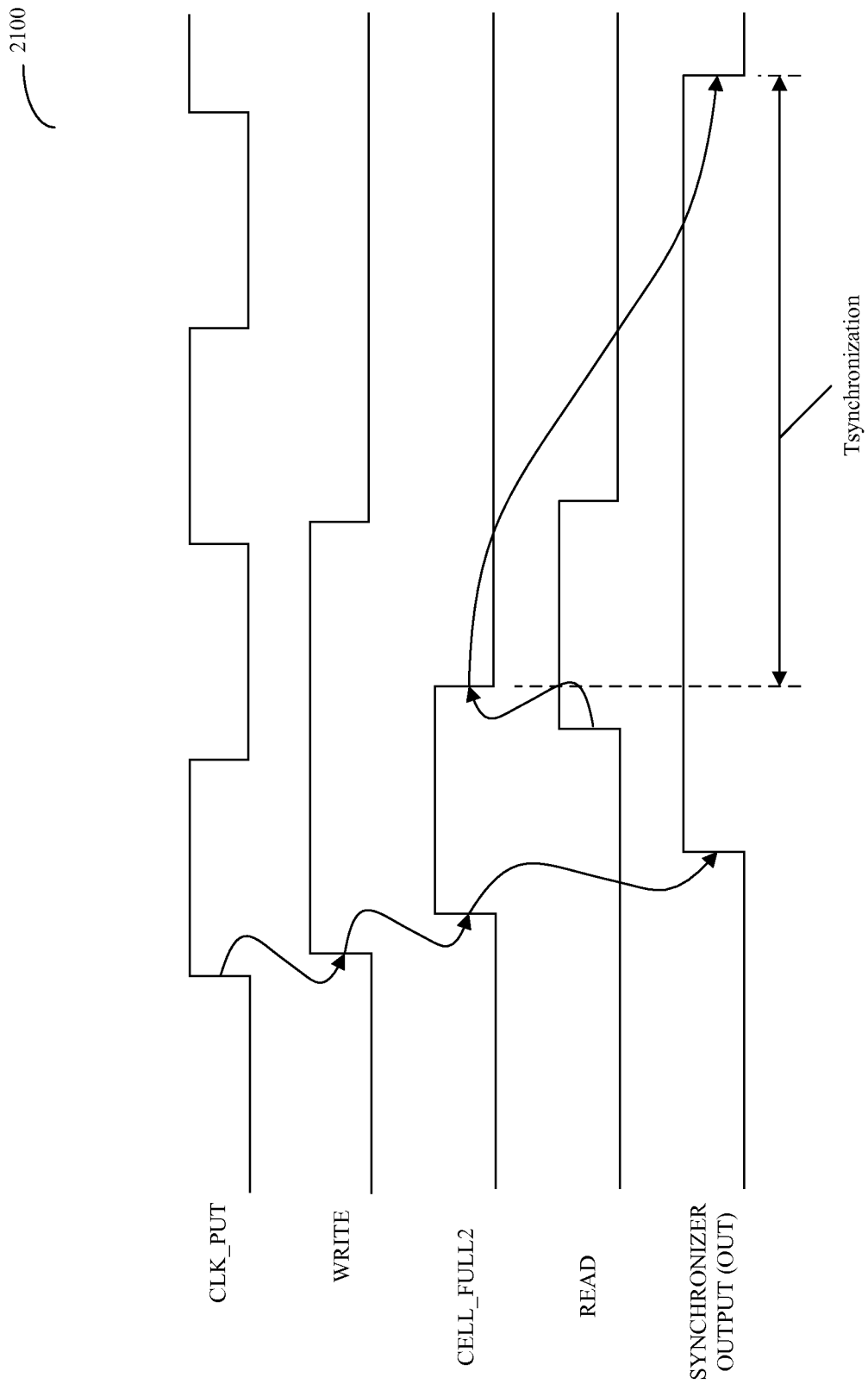
FIG. 16 is a timing diagram illustrating signals in accordance with an embodiment of the present invention.

Because the write signals are already synchronized to the put clock and the read signals to the get clock, in principle there is no need to have a change in the data-cell status due to a write operation go through a synchronizer in the put controller or to have a status change due to a read operation go through a synchronizer in the get controller. To elaborate on this, consider stage 2 in the synchronization FIFO. Recall that, in the put controller, the synchronizer for stage 2 has the cell_full2 signal connected to its input port. Signal cell_full2 is the output of the data validity controller for this FIFO stage (as illustrated in FIG. 6). This signal rises on a write operation to this FIFO stage and falls on a read operation. Therefore, the rising edge of cell_full2 is caused by a write operation, which happens synchronously to the put clock. On the other hand, the falling edge of cell_full2 is caused by a read operation, which is not synchronous to the put clock but the get clock. Thus, it may be necessary to synchronize the falling edge of cell_full2, but not the rising edge (as shown in FIG. 16, which presents a timing diagram 2100).

One way to achieve such an asymmetric latency through the synchronization FIFO is to use flip-flops with asynchronous set inputs, as shown in FIG. 17, which presents a block diagram illustrating a synchronizer 2200. In the put controller, the synchronizer for FIFO stage i uses the writei signal from the data validity controller as the asynchronous set, while in the get controller the readi signals from the data validity controller are used. Then, put-synchronizer output for FIFO stage i will go high as soon as a put request has been granted. Similarly, in the get controller, a get request causes the synchronizer output to change to high immediately. Thus, the synchronization-FIFO latency can be asymmetric, depending on which operations are looked at.

A synchronization FIFO that uses synchronizers with this asymmetric latency will not have overflow or underflow, and the earlier requirement that the synchronization FIFO have a number of stages that is greater than the synchronization latency is no longer necessary. However, a synchronization FIFO with enough FIFO stages to hide the synchronizer latencies is desirable for embodiments where maximum throughput is desired. In some embodiments, in order to ensure that all signals from the synchronization FIFO that are read by the receiver are synchronized to the receiver clock (and to reduce latency), a flip-flop is added to the get_ctrl_out signal. Moreover, instead of looking at the FIFOempty signal and only issuing requests on req_get if the FIFOempty signal is low, the receiver may look at the output signal from this flip-flop output signal (data_valid) to determine if there is valid data or not. In these embodiments, the receiver may issue a request in any get_clk cycle. However, because the receiver is not guaranteed to have its request fulfilled, the synchronization FIFO may acknowledge a successful read via the data_valid signal.

Similarly, on the transmitter side, a flip-flop controlled by the clock of the transmitter may be added to the put_ctrl_out signal. The output from this flip-flop is a space_available signal. A request on req_put from the transmitter may, therefore, be acknowledged by the space_available signal.

Note that there are several possible ways to implement the data_valid and space_available signals. In some embodiments, both go high if there was a prior request from the receiver/transmitter. Alternatively, both may go high whenever there is data/space available, regardless of a pending request.

Figure 18:
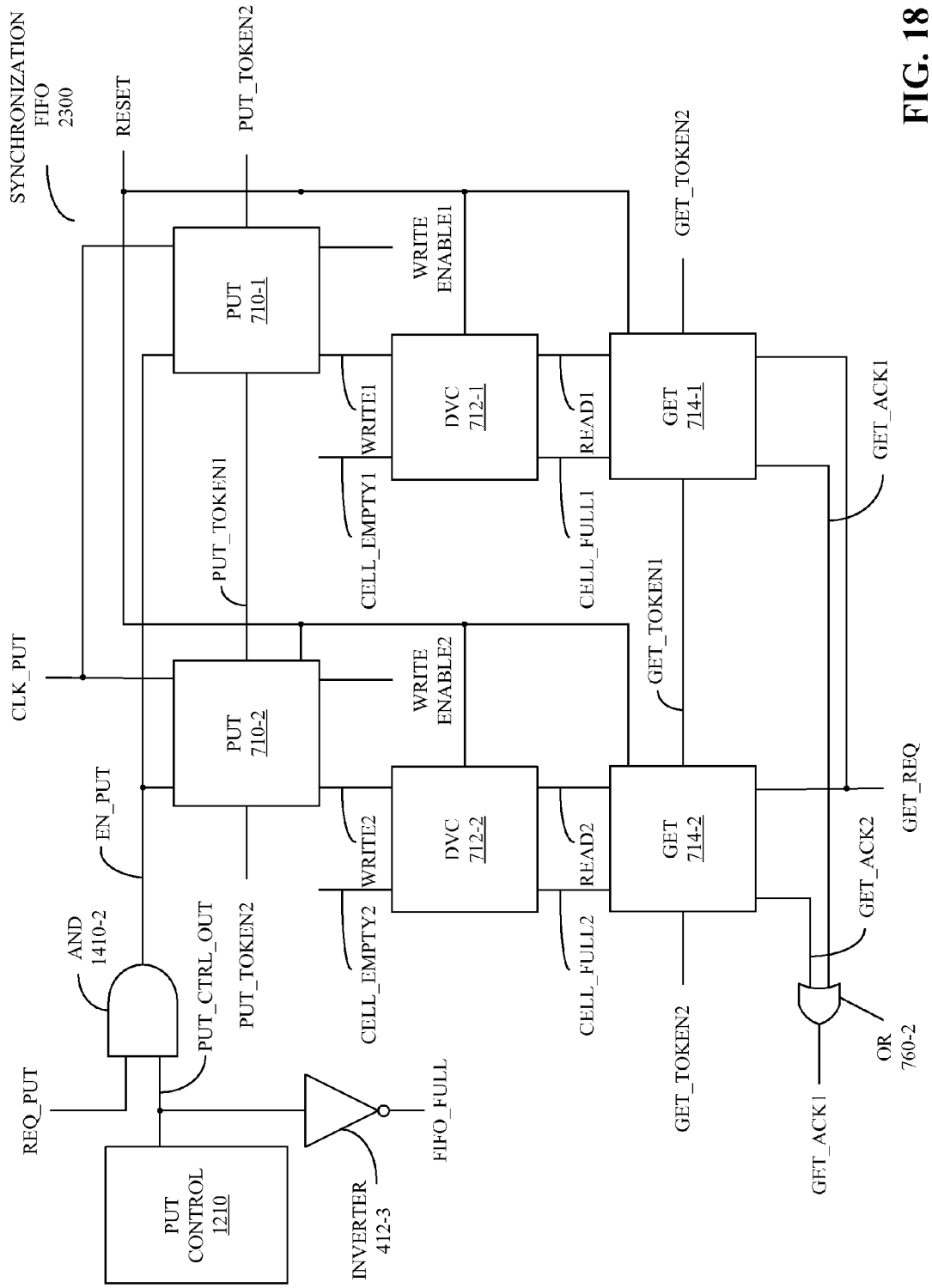
FIG. 18 is a block diagram illustrating a synchronization FIFO in accordance with an embodiment of the present invention.

In some embodiments, synchronous and asynchronous interfaces are combined. FIG. 18 presents a block diagram illustrating a synchronization FIFO 2300 with a synchronous put interface with an asynchronous get interface.

Figure 7C:
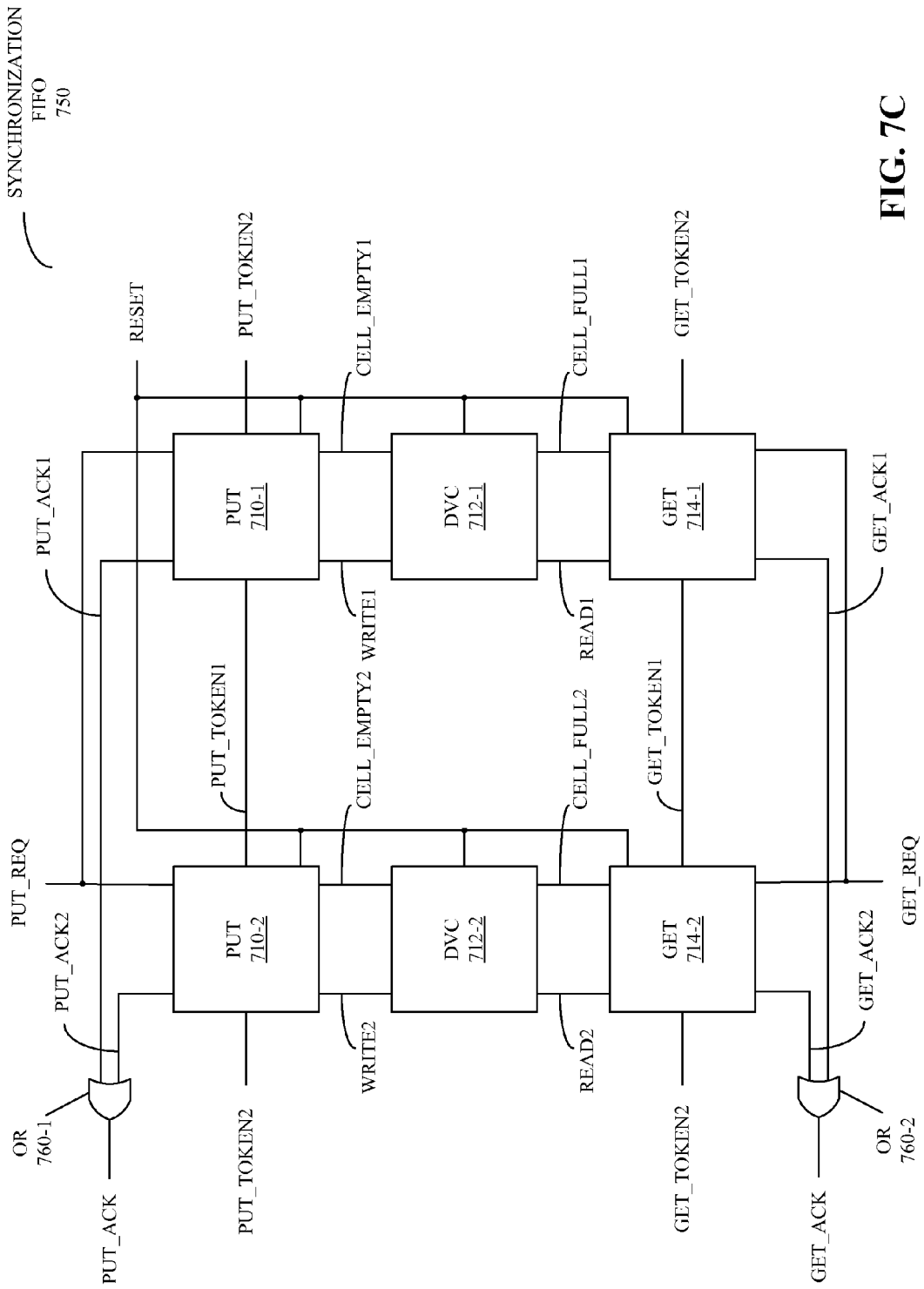
FIG. 7C is a block diagram illustrating a synchronization FIFO in accordance with an embodiment of the present invention.

In some embodiments, system 200 (FIG. 2), interface circuit 300 (FIG. 3), put interface cell 400 (FIG. 4), get interface cell 500 (FIG. 5), data validity controller 600 (FIG. 6), FIFO stage 700 (FIG. 7A), synchronization FIFO, data register 730 (FIG. 7B), synchronization FIFO 750 (FIG. 7C), system 1200 (FIG. 8), circuit 1300 (FIG. 9), put interface cell 1400 (FIG. 10), controller 1600 (FIG. 12), half-cycle synchronizer 1700 (FIG. 13), one-and-a-half cycle synchronizer 1800 (FIG. 14), synchronization FIFO 2000 (FIG. 15), synchronizer 2200 (FIG. 17), and/or synchronization FIFO 2300 include fewer or additional components. Moreover, two or more components may be combined into a single component and/or a position of one or more components may be changed.

Figure 19:
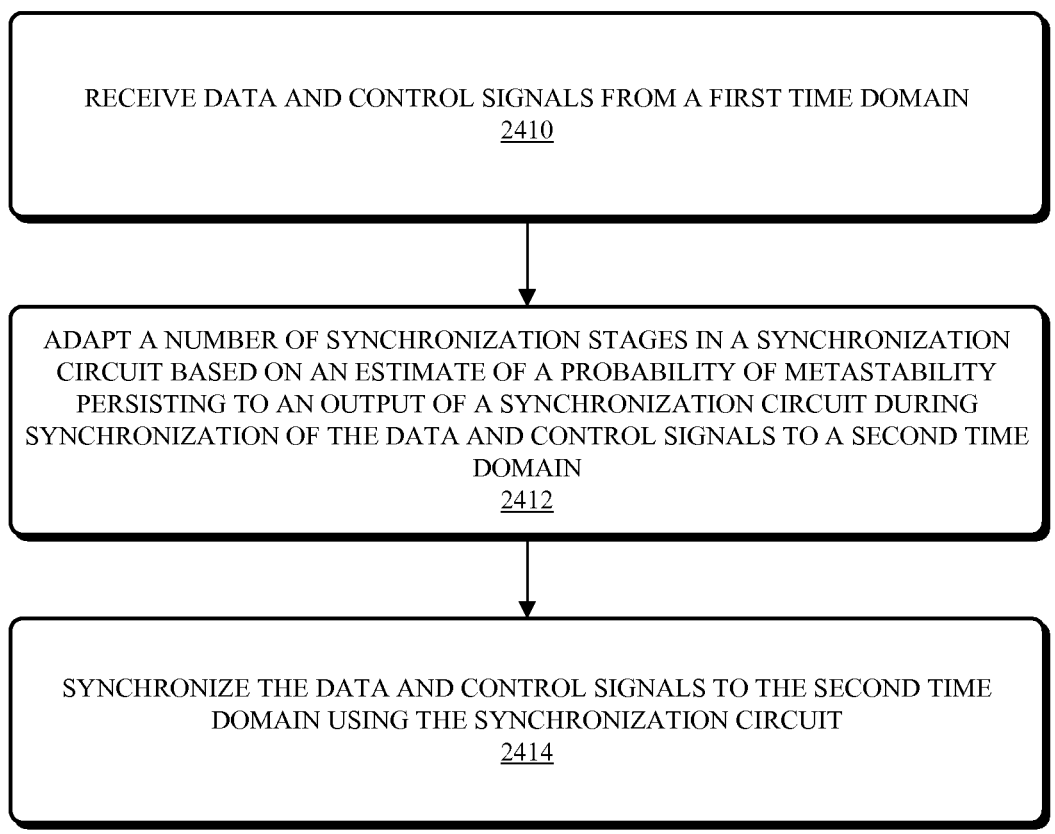
FIG. 19 is a flowchart illustrating a process for synchronizing signals in accordance with an embodiment of the present invention.

We now discuss techniques for synchronizing signals. FIG. 19 presents a flowchart illustrating a process 2400 for synchronizing signals, which may be implemented using a synchronization FIFO (such as one of the embodiments of a synchronization FIFO described previously). During operation, the synchronization FIFO receives data and control signals from a first time domain (2410). Then, the synchronization FIFO adapts a number of FIFO stages in the synchronizer based on an estimate of the probability of metastability persisting to the output of the synchronization circuit during synchronization of the data and control signals to a second time domain (2412). Next, the synchronization FIFO synchronizes the data and control signals to the second time domain (2414).

In some embodiments of process 2400, there may be additional or fewer operations. Moreover, the order of the operations may be changed and/or two or more operations may be combined into a single operation. Additionally, the preceding operations may be implemented using hardware and/or software, as is known in the art.

Figure 20:
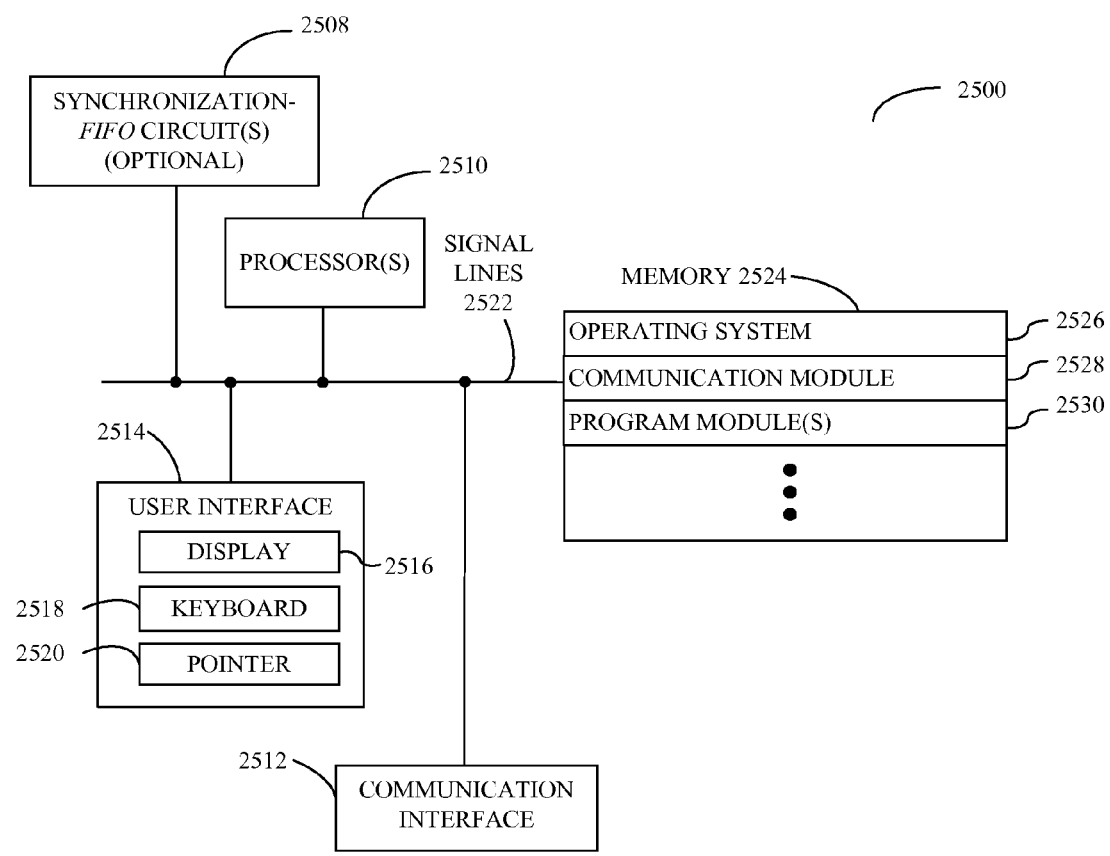
FIG. 20 is a block diagram illustrating a computer system in accordance with an embodiment of the present invention.

We now describe embodiments of a computer system that may include an embodiment of the synchronization FIFO and/or implement the function of the synchronization FIFO (for example, using software). FIG. 20 presents a block diagram illustrating a computer system 2500. Computer system 2500 includes: one or more optional synchronization-FIFO circuits 2508 (for example, disposed on one or more integrated circuits), one or more processors (or processor cores) 2510, a communication interface 2512, a user interface 2514, and one or more signal lines 2522 coupling these components together. Note that the one or more processors (or processor cores) 2510 may support parallel processing and/or multi-threaded operation, the communication interface 2512 may have a persistent communication connection, and the one or more signal lines 2522 may constitute a communication bus. Moreover, the user interface 2514 may include: a display 2516, a keyboard 2518, and/or a pointer 2520, such as a mouse. Note that synchronization FIFOs may be used to implement interfaces between the various components of computer system 2500, for example between different CPUs or between a CPU and its peripheral devices.

Memory 2524 in the computer system 2500 may include volatile memory and/or non-volatile memory. More specifically, memory 2524 may include: ROM, RAM, EPROM, EEPROM, flash, one or more smart cards, one or more magnetic disc storage devices, and/or one or more optical storage devices. Memory 2524 may store an operating system 2526 that includes procedures (or a set of instructions) for handling various basic system services for performing hardware-dependent tasks. Moreover, memory 2524 may also store communications procedures (or a set of instructions) in a communication module 2528. These communication procedures may be used for communicating with one or more computers, devices and/or servers, including computers, devices and/or servers that are remotely located with respect to the computer system 2500.

Memory 2524 may also include one or more program modules 2530 (or a set of instructions). In some embodiments, the one or more program modules implement some of all of the functions of the one or more optional synchronization-FIFO circuits 2508. Thus, in some embodiments computer system 2500 implements the synchronization of signals from two time domains using hardware, software, or a combination of hardware and software.

Instructions in the various modules in the memory 2524 may be implemented in: a high-level procedural language, an object-oriented programming language, and/or in an assembly or machine language. The programming language may be compiled or interpreted, i.e., configurable or configured, to be executed by the one or more processors (or processor cores) 2510.

Although the computer system 2500 is illustrated as having a number of discrete components, FIG. 20 is intended to be a functional description of the various features that may be present in the computer system 2500 rather than a structural schematic of the embodiments described herein. In practice, and as recognized by those of ordinary skill in the art, the functions of the computer system 2500 may be distributed over a large number of servers or computers, with various groups of the servers or computers performing particular subsets of the functions. In some embodiments, some or all of the functionality of the computer system 2500 may be implemented in one or more application-specific integrated circuits (ASICs) and/or one or more digital signal processors (DSPs).

Computer system 2500 may include fewer components or additional components. Moreover, two or more components may be combined into a single component and/or a position of one or more components may be changed. In some embodiments the functionality of computer system 2500 may be implemented more in hardware and less in software, or less in hardware and more in software, as is known in the art.

Devices and circuits described herein may be implemented using computer-aided design tools available in the art, and embodied by computer-readable files containing software descriptions of such circuits. These software descriptions may be: behavioral, register transfer, logic component, transistor and/or layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

In some embodiments, the synchronization FIFO includes a modular design with interchangeable synchronous and asynchronous put and get interfaces.

In some embodiments, where the synchronization FIFO includes one or more synchronous interface cells (such as put or get interfaces), each of these interface cells may have its own synchronizer.

In some embodiments, the synchronization FIFO is implemented using standard cells.

In some embodiments, the synchronization FIFO includes FIFO stages, each of which includes a put interface, a get interface and a data-storage element. Note that the put interface can communicate using either a synchronous or an asynchronous communication protocol. Similarly, the get interface can communicate using either a synchronous or an asynchronous communication protocol. Consequently, the synchronization FIFO may be modular.

In some embodiments, a given put interface communicates with a sender using a synchronous protocol. Moreover, the given put interface includes its own synchronizer to synchronize control signals from other interface cells in the FIFO stages to a clock domain of a put client.

In some embodiments, a given get interface communicates with a receiver using a synchronous protocol. Moreover, the given get interface includes its own synchronizer to synchronize control signals from other interface cells in the FIFO stages to a clock domain of a get client.

In some embodiments, synchronizers in each FIFO stage are configured to provide a first synchronization latency when an event input to the synchronizer originates in a time domain of the sender and are configured to provide a second latency, which is larger than the first synchronization latency, when the input event arises from other timing domains.

Another embodiment provides a synchronization circuit that includes multiple FIFO stages. Each FIFO stage includes a put interface, a get interface, and a data-storage element. Moreover, a given interface (put or get) may include a synchronizer with a fixed or variable number of synchronization stages (such as latches or flip-flops). Outputs from the synchronizers in (put or get) interfaces in the FIFO stages may be logically combined to provide a control signal that indicates whether or not one or more the data-storage elements is full or empty.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A synchronization circuit, comprising:
multiple selectively coupled synchronization stages configurable to synchronize data and control signals between a first time domain and a second time domain, wherein the synchronization can be performed based on asynchronous or synchronous events associated with either the first time domain or the second time domain;
multiple FIFO stages, wherein at least one of the FIFO stages includes an instance of the multiple selectively coupled synchronization stages, and wherein the multiple FIFO stages are configured to exchange a put token that determines which of the multiple FIFO stages services a request from a transmitter of at least some of the data and control signals; and
control logic, coupled to the synchronization stages, configured to adapt a number of synchronization stages used to synchronize the data and the control signals based on an estimate of a probability of metastability persisting to an output of the synchronization circuit during synchronization.

2. The synchronization circuit of claim 1, wherein the synchronization circuit is configured to adapt a synchronization latency of the synchronization circuit without changing other functions of the synchronization circuit.

3. The synchronization circuit of claim 1, wherein the synchronization circuit is configured to adapt the number of synchronization stages once.

4. The synchronization circuit of claim 1, wherein the synchronization circuit is configured to adapt the number of synchronization stages dynamically.

5. The synchronization circuit of claim 4, wherein the synchronization circuit is configured to adapt the number of synchronization stages based on changes to an operating frequency in either the first time domain or the second time domain.

6. The synchronization circuit of claim 1, wherein the synchronization circuit is configured to adapt the number of synchronization stages using input steering.

7. The synchronization circuit of claim 1, wherein the synchronization circuit is configured to adapt the number of synchronization stages using output steering.

8. The synchronization circuit of claim 1, wherein the synchronization stages include flip-flops.

9. The synchronization circuit of claim 1, wherein the synchronization stages comprise a FIFO buffer.

10. The synchronization circuit of claim 1, wherein the synchronization circuit is used for inter-chip communication.

11. The synchronization circuit of claim 1, wherein the synchronization circuit is used for intra-chip communication.

12. The synchronization circuit of claim 1, wherein the synchronization circuit only includes circuits in a standard-cell library.

13. The synchronization circuit of claim 1, wherein the synchronization stages include asymmetric synchronization elements; and
wherein the asymmetric synchronization elements are configured to provide a first synchronization latency when an event input to the synchronizer originates in the same time domain as the output of the synchronizer and are configured to provide a second synchronization latency, which is larger than the first synchronization latency, when the input event arises from a different time domain than the time domain of the output of the synchronizer.

14. The synchronization circuit of claim 1, wherein a given FIFO stage includes an instance of the multiple selectively coupled synchronization stages, and wherein the given FIFO stage further includes:
   a put control interface;
   a data-storage element; and
   a get control interface, wherein the given FIFO stage is configured to sequentially pass the put token between the put control interfaces in the FIFO stages and is configured to sequentially pass a get token between the get control interfaces in the FIFO stages;
   wherein, if the put control interface contains the put token and the data-storage element is empty, data is received from the first time domain; and
   wherein, if the get control interface contains the get token and the data-storage element is full, data is provided to the second time domain.

15. The synchronization circuit of claim 14, wherein control signals from the asymmetric synchronization elements associated with the put control interfaces in the FIFO stages are logically combined to provide an okay-to-put control signal which is only enabled when the at least a portion of at least one data-storage element is guaranteed to be empty, thereby ensuring proper operation of the synchronization circuit.

16. The synchronization circuit of claim 14, wherein control signals from the asymmetric synchronization elements associated with the get control interfaces in the FIFO stages are logically combined to provide an okay-to-get control signal which is only enabled when the at least a portion of at least one data-storage element is guaranteed to be full, thereby ensuring proper operation of the synchronization circuit.

17. The synchronization circuit of claim 14, wherein at least one of outputs from synchronizers in the put interfaces in the FIFO stages are logically combined to provide the okay-to-put control signal and outputs from synchronizers in the get interface in the FIFO stages are logically combined to provide the okay-to-get control signal.

18. The synchronization circuit of claim 1, wherein the synchronization circuit is disposed on an integrated circuit.

19. A non-transitory computer-readable medium containing data representing a synchronization circuit, wherein the synchronization circuit includes:
   multiple selectively coupled synchronization stages configurable to synchronize data and control signals between a first time domain and a second time domain, wherein the synchronization can be performed based on asynchronous or synchronous events associated with either the first time domain or the second time domain;
   multiple FIFO stages, wherein at least one of the FIFO stages includes an instance of the multiple selectively coupled synchronization stages, and wherein the multiple FIFO stages are configured to exchange a put token that determines which of the multiple FIFO stages services a request from a transmitter of at least some of the data and control signals; and
   control logic, coupled to the synchronization stages, configured to adapt a number of synchronization stages used to synchronize the data and the control signals based on an estimate of a probability of metastability persisting to an output of the synchronization circuit during the synchronization.

20. A computer system comprising an integrated circuit, wherein the integrated circuit includes a synchronization circuit that contains:
   multiple selectively coupled synchronization stages configurable to synchronize data and control signals between a first time domain and a second time domain, wherein the synchronization can be performed based on asynchronous or synchronous events associated with either the first time domain or the second time domain;
   multiple FIFO stages, wherein at least one of the FIFO stages includes an instance of the multiple selectively coupled synchronization stages, and wherein the multiple FIFO stages are configured to exchange a put token that determines which of the multiple FIFO stages services a request from a transmitter of at least some of the data and control signals; and
   control logic, coupled to the synchronization stages, configured to adapt a number of synchronization stages used to synchronize the data and the control signals based on an estimate of a probability of metastability persisting to an output of the synchronization circuit during the synchronization.

* * * * *